United States Patent

Storm et al.

[11] Patent Number: 6,013,904
[45] Date of Patent: *Jan. 11, 2000

[54] INDUCTION HARDENING APPARATUS FOR A CRANKSHAFT

[75] Inventors: John M. Storm, Danville; Max E. Stewart, Plainfield; Spencer L. Gibbs, Danville, all of Ind.

[73] Assignee: Contour Hardening, Inc., Indianapolis, Ind.

[*] Notice: This patent is subject to a terminal disclaimer.

[21] Appl. No.: 09/148,478

[22] Filed: Sep. 8, 1998

Related U.S. Application Data

[63] Continuation-in-part of application No. 08/959,799, Oct. 29, 1997.

[51] Int. Cl.$^7$ ...................................................... H05B 6/40
[52] U.S. Cl. ............................................ 219/639; 219/652
[58] Field of Search .................................... 219/652, 637, 219/639, 640, 647, 648, 650, 660, 661, 663, 665, 666, 672, 673, 675, 676, 677

[56] References Cited

U.S. PATENT DOCUMENTS

| | | |
|---|---|---|
| 3,914,572 | 10/1975 | Jensen . |
| 3,935,416 | 1/1976 | Cachat . |
| 4,604,510 | 8/1986 | Laughlin et al. . |
| 4,675,488 | 6/1987 | Mucha et al. ........................ 219/10.43 |
| 4,714,809 | 12/1987 | Hammond et al. . |
| 4,728,761 | 3/1988 | Mucha et al. . |
| 4,757,170 | 7/1988 | Mucha et al. ........................ 219/10.43 |
| 4,816,633 | 3/1989 | Mucha et al. . |
| 4,867,810 | 9/1989 | Novorsky ................................ 148/150 |
| 4,894,501 | 1/1990 | Pfaffmann et al. .................. 219/10.43 |
| 4,897,518 | 1/1990 | Mucha et al. . |
| 5,157,231 | 10/1992 | Baeuerle et al. . |
| 5,451,749 | 9/1995 | Griebel et al. . |
| 5,796,078 | 8/1998 | Ottenwaelder et al. ................ 219/639 |

*Primary Examiner*—Tu Ba Hoang
*Attorney, Agent, or Firm*—Woodard, Emhardt, Naughton Moriarty & McNett

[57] ABSTRACT

An induction hardening apparatus for inductively heating and quench hardening a crankshaft includes an arrangement of two workstations similarly configured and a robotic device indexing the crankshaft from a first workstation to a second workstation. The induction hardening apparatus is designed with a single induction coil located at the first workstation for the sequential induction heating and quench hardening of the pins of the crankshaft. At the second workstation, a single induction coil is used for the bearing surfaces of the crankshaft. One feature of the present invention is that the induction coils do not contact the surfaces of the crankshaft which are being inductively heated and quench hardened. Crankshaft dimensions and geometry are programmed into servodrive systems which move the corresponding coil in X and Y directions accurately tracing the orbit or path of each pin and each bearing surface. Another feature of the present invention is the use of an offset 180 degree coil which provides improved heating patterns in less time than traditional 90 degree coils.

26 Claims, 27 Drawing Sheets

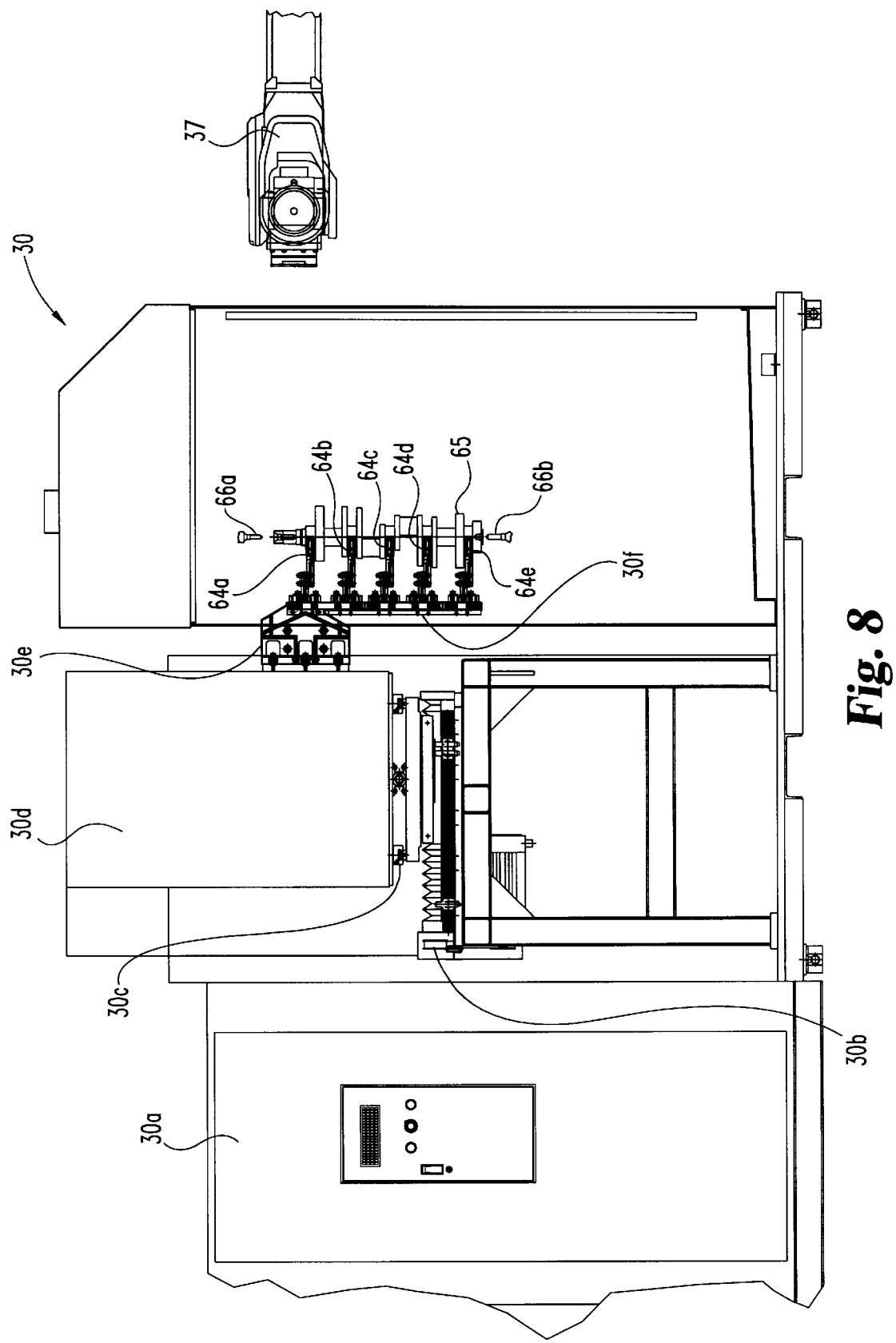

INDUCTION HARDENING APPARATUS FOR A CRANKSHAFT

REFERENCE TO RELATED APPLICATIONS

The present patent application is a continuation-in-part patent application of U.S. Ser. No. 08/959,799, filed Oct. 29, 1997, presently pending.

BACKGROUND OF THE INVENTION

The present invention relates in general to methods and apparata for inductively heating and quench hardening a crankshaft. More specifically, the present invention relates to inductively heating and quench hardening a crankshaft, which may be oriented either horizontally or vertically, wherein the induction coil assembly (or assemblies) do not contact the surfaces of the crankshaft which are to be induction hardened. Computer controlled servomotors and X and Y drive systems are used to position and move the induction coil assembly relative to a crankpin portion of the crankshaft as the crankshaft rotates at a predetermined RPM. The travel of the induction coil assembly is based upon mathematical formulae and the crankshaft geometry, including crankshaft dimensions and the particular location of the crankpin portion to be induction hardened relative to the longitudinal axis of the crankshaft.

An automotive crankshaft is made up of a series of crankpins, one for each cylinder, in the case of in-line engines, or one for each pair of cylinders, in the case of V-type engines. The function of the crankshaft is to convert the reciprocating motion of the piston and its connecting rod into rotating motion. The throw of the crankshaft is equal to the stroke of the engine. The crankshaft needs to be properly balanced in order to eliminate centrifugal forces and accordingly the crankshaft is counterbalanced by weights placed opposite to the corresponding crankpins or just "pins". Each pin is received within one end of a corresponding connecting rod whose opposite end is pinned to a piston. Crankshafts are also configured with axial bearing surfaces which are designed for receipt by the main bearings. A six cylinder in-line crankshaft would typically have seven main bearings.

Due to the load and wear on the pins and on the bearing surfaces, the hardening of these portions of the crankshaft is important. One approach to this task is to inductively heat and then quench harden these critical surfaces. Traditionally the approach which has been followed is to place the crankshaft in a horizontal orientation and as the crankshaft reaches a substantially elevated temperature due to the induction heating, a support member is moved into position in order to support the crankshaft and keep it from sagging. This traditional approach also involves the induction coil and/or some portion of the induction coil assembly contacting and in fact actually riding on the surfaces which are to be inductively heated and quench hardened. This metal-to-metal contact accelerates the wear on the coil assembly, necessitating that the coil assembly be replaced periodically. The need to replace the induction coil assembly represents not only an added cost factor but also down time to the induction hardening equipment.

By orienting the crankshaft horizontally, the contact by the induction coil assembly on the critical surfaces of the crankshaft is actually encouraged due to the convenience of letting the induction coil assembly "ride" on the pins and bearing surfaces as the crankshaft is rotated between centers. This traditional approach of having the induction coil assembly function like a follower does not require any separate drive system for the induction coil assembly since the critical surfaces are in contact with the coil assembly. However, direct contact between the coil assembly and the portion of the crankshaft to be induction hardened is seen as a substantial disadvantage, not only due to wear of the induction coil assembly and the horizontal mounting of the crankshaft, but for the additional reasons which are set forth below.

When the induction coil assembly contacts the pins and/or bearing surfaces, it is difficult to identify the wear condition of the coil assembly. By riding directly on the crankshaft surfaces, the contacting surface of the induction coil assembly is effectively hidden from view, thereby making it difficult to assess the level or degree of wear on the coil assembly. This in turn means that the induction coil assembly can be run too long and reach a point at which it arcs out and this typically ruins the part and ruins or damages the coil assembly. Contact between the coil assembly and the crankshaft often results in marring or galling of the crankshaft surface and this requires extra grind stock which can then be machined away in order to grind out the surface imperfections. An extended post-hardening step is then required.

It would be a substantial improvement to the present methods and apparata for induction hardening crankshafts if an apparatus could be provided whereby the induction coil assembly does not have to contact the pins and bearing surfaces. Such an apparatus would significantly improve coil assembly life. It is also felt that being able to orient the crankshaft vertically would be advantageous. While the prior art does not envision any suitable solution to the problems which have been identified, the present invention provides an improved method and apparatus which achieves both improvements.

According to the present invention, the crankshaft which is to be induction hardened can be vertically oriented, even though the present invention still works quite well if the crankshaft is oriented horizontally. Further, one induction coil assembly is provided for the crankshaft pins and is located and operated at a first workstation. Either a separate induction coil assembly or a series of assemblies are provided for the bearing surfaces and are located and operated at a second workstation. These coil assemblies are designed such that there is no contact with the crankshaft surfaces which the coil assemblies are to induction harden. This improves the coil assembly life. According to the present invention, the dimensions and geometry of the crankshaft are used to define the path or orbit of each pin and the tracking path for each induction coil assembly is computed and programmed into suitable drive systems which control the travel of each coil assembly. While the bearing surfaces also have an orbit, these orbits are concentric with the axis of rotation of the crankshaft. Accordingly the coil assembly (or assemblies) used for these bearing surfaces does not have to travel in a matching orbit, but instead is stationary. Alternate embodiments of the present invention provide design variations to account for the presence of counterweights or for the presence of any other factor which could affect the balance of mass (heat balance) adjacent the pins of the crankshaft.

While there are other designs which suggest a vertical orientation for the workpiece, these other designs are limited to camshafts, not crankshafts. There are numerous differences between these two types of drive components, several of which suggest that technology directed to camshafts has very little relevancy to the present invention and the issues which are addressed and solved by the present invention.

For example, the individual cams of a camshaft are axially mounted and the protruding portion of the cam geometry is dimensionally fairly minor. There simply is not the off-axis dimensional shift for cams the way there is for the pins of a crankshaft. This results in a pin orbit of substantial size and travel relative to whatever cam orbit might be present. In turn, this results in substantially different challenges and problems for the design of a suitable induction coil tracking apparatus, with the crankshaft presenting the more challenging design task.

With regard to the comparison between a crankshaft and a camshaft, the profile of a crankpin is symmetrical and requires a uniform case depth. A cam of a camshaft is not symmetrical and does not require a uniform case depth. Accordingly, the induction coil assembly does not have to follow a cam and the cam can be induction hardened without having to move the coil assembly in a matching orbit. The desired case depth patterns for the cams can be achieved without displacement of the induction coil assembly. The lower loads placed on a cam mean that the required hardness depth can be less than that of a crankshaft pin, causing less demanding induction hardening. While the present invention can be used for a camshaft, there is no reason to do so.

Another feature addressed by the present invention is the arrangement of the handling equipment and the cooperating workstations. In order to provide handling efficiencies, the present invention is configured with multiple workstations for the loading, induction hardening, and unloading of the workpiece in sequential action.

One workstation is configured for induction hardening of the crankshaft pins. Another workstation is configured for induction hardening of the bearing surfaces. These two workstations may be arranged in either order since the pins and bearing surfaces can be induction hardened in any order. Since the bearing surfaces are coaxial with the centers supporting the crankshaft, the induction coil assembly for the bearing surfaces operates in an orbit which is coincident with the axis of rotation (longitudinal axis of the crankshaft). In contrast, the pins which are sequentially induction hardened, typically one pin at a time, are not located on-axis and have a different circumferential location, one pin to the next, relative to the position of the crankshaft.

While induction hardening of crankshafts is known and while the vertical orientation of camshafts is known, the present invention remains novel and unobvious. The combination of structural features of the present invention provides significant advantages to what presently exists and the long felt and heretofore unsatisfied need for the present invention validates its novel and unobvious advance in the art.

SUMMARY OF THE INVENTION

An induction hardening apparatus for inductively heating and quench hardening a workpiece according to one embodiment of the present invention comprises a fixture for positioning and supporting the workpiece at a workpiece location, a rotary drive for rotating the workpiece, an induction hardening station positioned adjacent the workpiece location and including an induction coil assembly and a positioning system for moving the induction coil assembly in a predetermined path, a control for generating coil path data based upon the geometry and dimensions of a portion of the workpiece to be induction hardened, the control being operatively connected to the positioning system and the portion of the workpiece being moved in an orbital path during workpiece rotation wherein the predetermined path generated by the positioning system tracks the orbital path such that the spacing between the induction coil assembly and the workpiece portion during rotation of the workpiece remain substantially uniform, the induction coil assembly being moved so as to be free of any contact with the workpiece portion.

One object of the present invention is to provide an improved induction hardening apparatus for a workpiece.

Related objects and advantages of the present invention will be apparent from the following description.

BRIEF DESCRIPTION OF THE DRAWINGS

FIG. 8 is a side elevational view of an induction hardening apparatus for the bearing surfaces of a crankshaft according to a typical embodiment of the present invention.

DESCRIPTION OF THE PREFERRED EMBODIMENT

Figure 1:
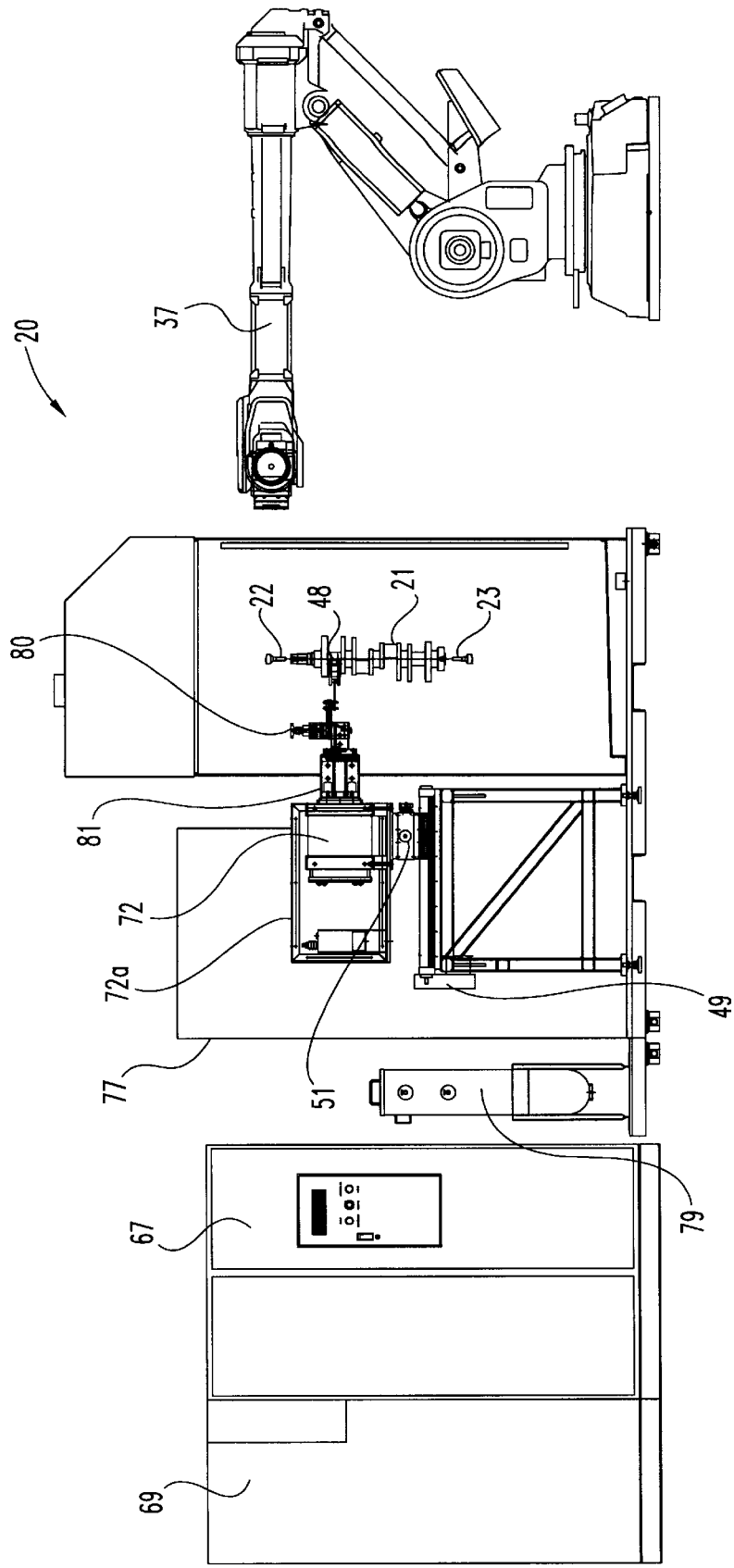
FIG. 1 is a side elevational view of an induction hardening apparatus for the pins of a crankshaft according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 5:
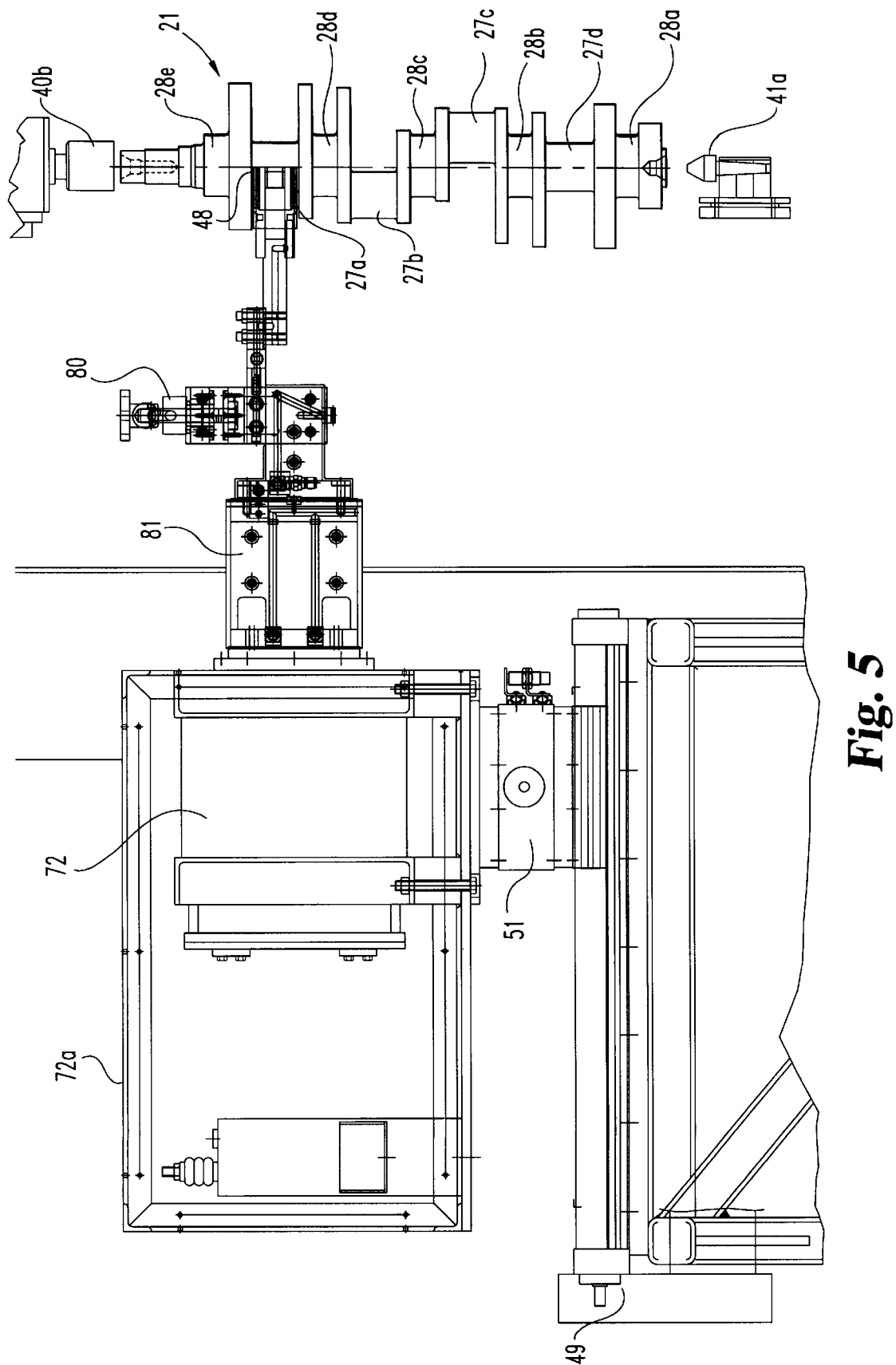
FIG. 5 is an enlarged side elevational view of the crankshaft to be induction hardened by the FIG. 1 induction hardening apparatus, including portions of the coil drive system.

Referring to FIGS. 1, 2, 3, 4, 5, 6, and 6A, there is illustrated an induction hardening apparatus 20 which is constructed and arranged for inductively heating and quench hardening a crankshaft 21. Crankshaft 21 is positioned in a vertical orientation and supported between centers 22 and 23. The illustration of the upper center 22 should be regarded as merely diagrammatic for the purpose of representing a true vertical orientation for the crankshaft. In actual practice when the pins of the crankshaft are being induction hardened, a positive lock (chuck) is required and is used. This is illustrated in FIG. 5. This fixturing of the crankshaft permits the use of a cooperating rotary drive mechanism in order to rotatably spin the crankshaft, on axis, between the positive lock (chuck) and lower center 23. Although the crankshaft 21 in FIGS. 1 and 5 is illustrated in a vertical mounting orientation between vertical centers, the present invention is equally suitable for a crankshaft which is positioned in a substantially horizontal orientation between horizontal centers.

With continued reference to FIG. 5, the details of crankshaft 21 are illustrated. The crankshaft used for an explanation of the present invention includes four cylinder (crank) pins 27a–27d and five cylindrical bearing surfaces 28a–28e. As would be known to one of ordinary skill in the crankshaft art, balance weights are disposed in cooperative relation to each pin in order to counterbalance the pin rotation and preferably eliminate any net centrifugal force. The pins 27a–27d and bearing surfaces 28a–28e are arranged in alternating sequence and represent critical wear surfaces which need to be hardened and the preferred method is by inductively heating and quench hardening these critical portions of the crankshaft. This is the role of apparatus 20 which is constructed and arranged to sequentially position an induction coil assembly adjacent each pin 27a–27d and perform the required heat treating steps. The bearing surfaces 28a–28e are inductively heated and quench hardened at another workstation which in one embodiment of the present invention comprises another portion of apparatus 20. In one embodiment of the present invention (see FIG. 6A), the water quench capability is built into the induction coil assemblies which are used for the pins and bearing surfaces. In another embodiment, the quench step is performed by a separate quench station which is not built into the coil assembly.

According to the present invention there are actually three primary configurations for apparatus 20 with a secondary variable for each primary configuration. In the illustrations of FIGS. 1–4, apparatus 20 includes two virtually identical workstations, both of which are designed for the induction hardening of pins. This configuration permits two crankshafts to be induction hardened simultaneously, in a side-by-side arrangement. A second apparatus 30 (see FIGS. 8–11) is provided for the induction hardening of the bearing surfaces of the crankshaft. The apparatus 30 used for the bearing surfaces may be used prior to the use of apparatus 20 or subsequent to the use of apparatus 20. The sequence of induction hardening as between the pins and the bearing surfaces is not critical. However, if multiple bearing surfaces are induction hardened simultaneously, a post grinding operation may be desired in order to eliminate any minor distortion and bring the crankshaft back into tolerance. Apparatus 30 is constructed and arranged with two virtually identical workstations, like apparatus 20, and thus two crankshafts can be processed in a side-by-side manner at the same time.

A second primary configuration of the present invention includes a design for apparatus 20 which includes only one (1) workstation which is constructed and arranged for the induction hardening of pins. In a similar fashion, apparatus 30 is constructed and arranged with only one workstation for the induction hardening of the bearing surfaces. These two single-workstation apparata may be used in any order and need not be used in close time proximity to one another. Conceivably, as a minor modification to this second primary configuration, it is envisioned that one apparatus would be arranged with a plurality of workstations and the other apparatus would be arranged with only one workstation.

The third primary configuration of the present invention includes a design for apparatus 20 where there are two workstations, but where one workstation is used for the pins of the crankshaft and the other workstation is used for the bearing surfaces of the crankshaft. This side-by-side arrangement of two workstations where each one is dedicated to a different portion of the crankshaft may be advantageous in smaller shops with more limited runs.

Figure 14A:
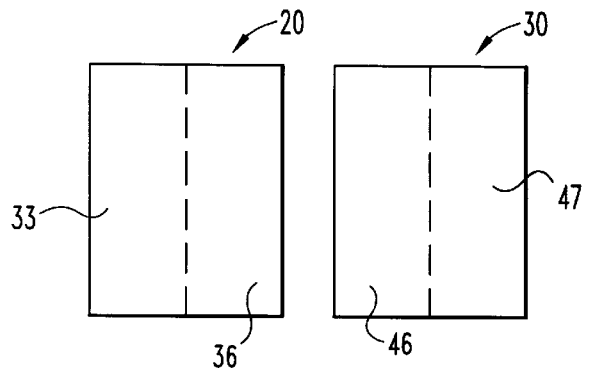
FIG. 14A is a diagrammatic illustration of one option for arranging the workstations of the present invention.
Figure 14B:
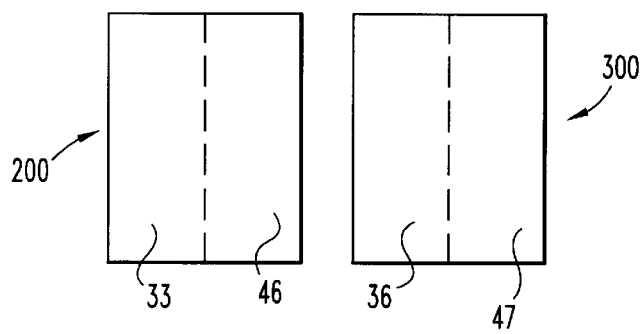
FIG. 14B is a diagrammatic illustration of another option for arranging the workstations of the present invention.
Figure 14C:
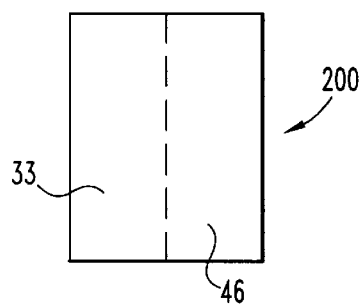
FIG. 14C is a diagrammatic illustration of another option for arranging the workstations of the present invention.

There are several apparatus and workstation combinations for the present invention and while some of the combinations have been mentioned, additional combinations are illustrated in FIGS. 14A–14E. As a partial recap of the foregoing descriptions, FIG. 14A diagrammatically illustrates two apparata 20 and 30 each with two workstations 33 and 36 and 46 and 47, respectively. Workstations 33 and 36 are constructed and arranged for induction hardening the pins of the crankshaft. Workstations 46 and 47 are constructed and arranged for induction hardening the bearing surfaces of the crankshaft. FIG. 14B diagrammatically illustrates the use of two virtually identical apparata 200 and 300. Each apparatus includes a pin workstation (33, 36) and a bearing surface workstation (46, 47). In FIG. 14C a single apparatus 200 is used and thus it should be understood that the number of apparata can be varied, the number of workstations at each apparatus can be varied, and the particular style of workstation at each apparatus can be varied.

Figure 13:
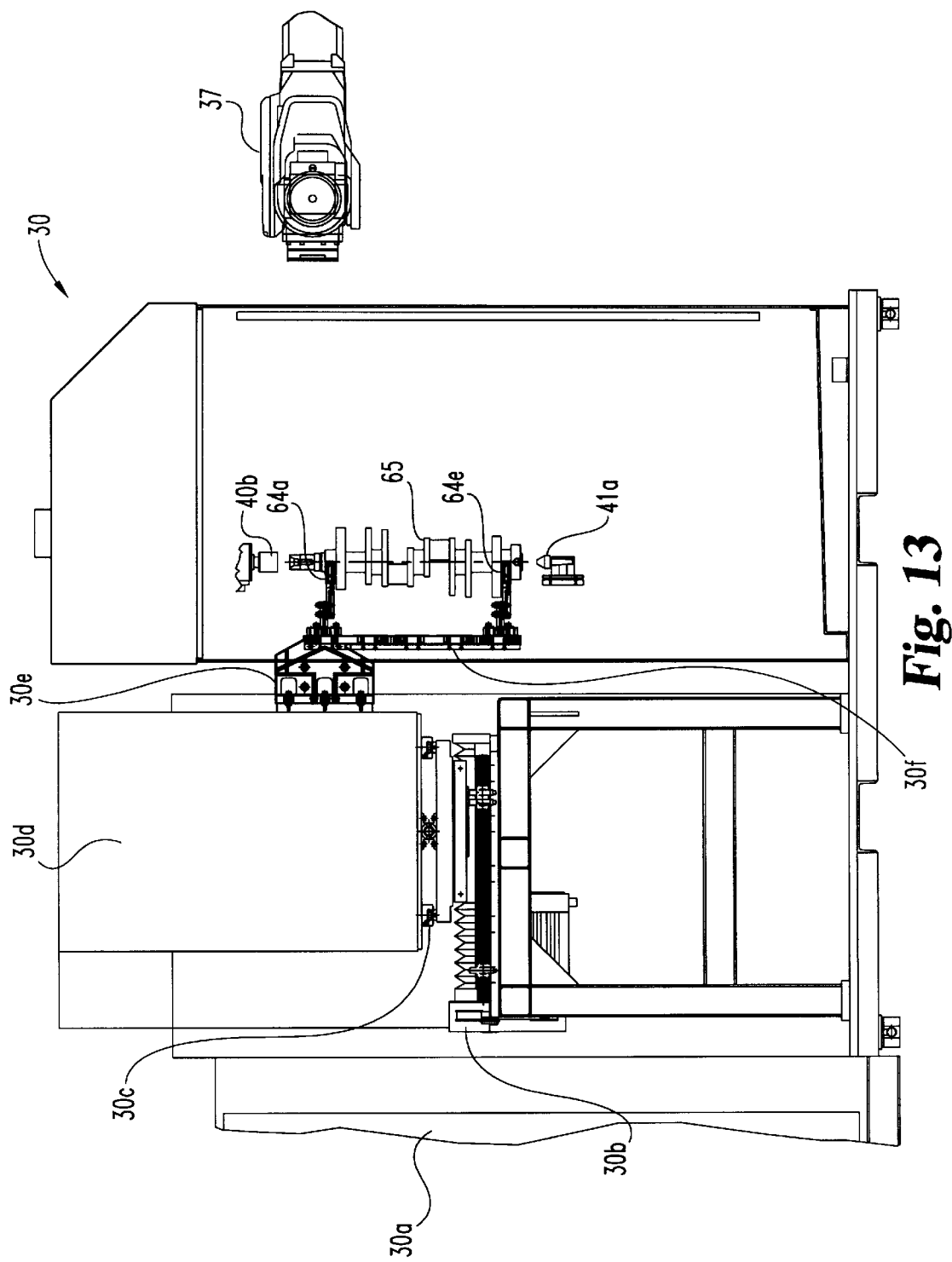
FIG. 13 is an enlarged side elevational view of the crankshaft to be induction hardened by the FIG. 8 induction hardening apparatus.
Figure 14D:
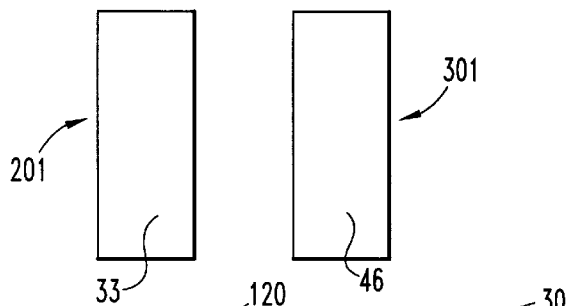
FIG. 14D is a diagrammatic illustration of another option for arranging the workstations of the present invention.
Figure 14E:
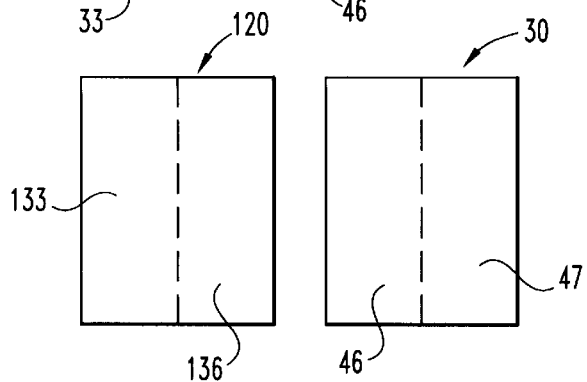
FIG. 14E is a diagrammatic illustration of another option for arranging the workstations of the present invention.

FIG. 14D diagrammatically illustrates two separate apparata 201 and 301, each of which include a single workstation, one workstation 33 for pins and the other workstation 46 for bearing surfaces. In FIG. 14E apparata 120 and 130 are diagrammatically illustrated and in this arrangement workstations 133 and 136 are constructed and arranged for the induction heating of two (or more) pins simultaneously. Apparatus 120 is illustrated in detail in FIGS. 2A and 3A but is mentioned here in order to cover a further variation of the present invention. It is also to be understood that workstations 46 and 47 are constructed and arranged to induction harden multiple bearing surfaces simultaneously, typically either two at a time or three at a time, see FIGS. 12 and 13. Further, it is to be understood that the plurality-of-pins workstations 133, 136 can be substituted for workstations 33 and/or 36, respectively, in any one of the FIGS. 14A–14D arrangements.

Figure 15:
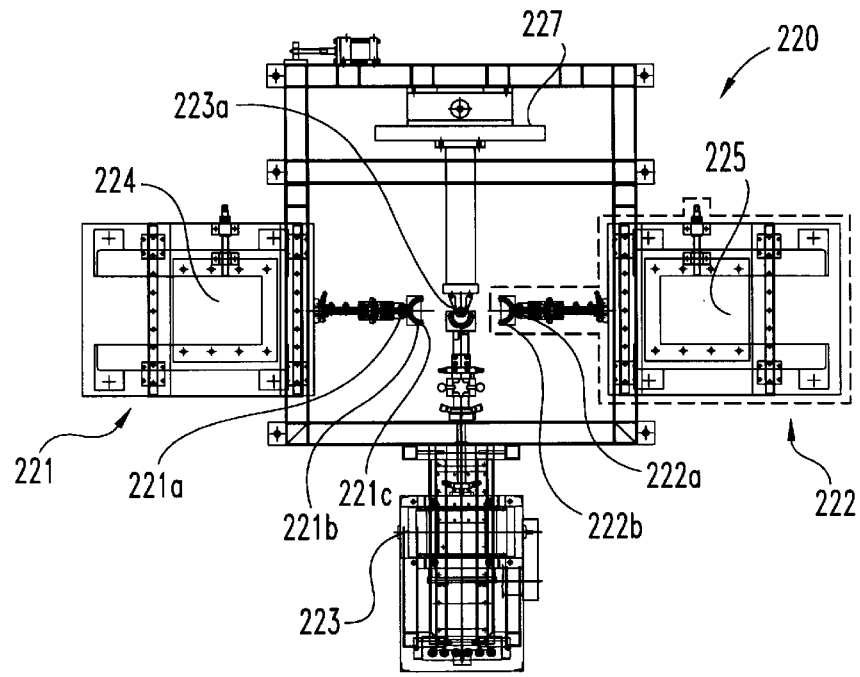
FIG. 15 is a diagrammatic, top plan view of an induction hardening apparatus according to another embodiment of the present invention.
Figure 16:
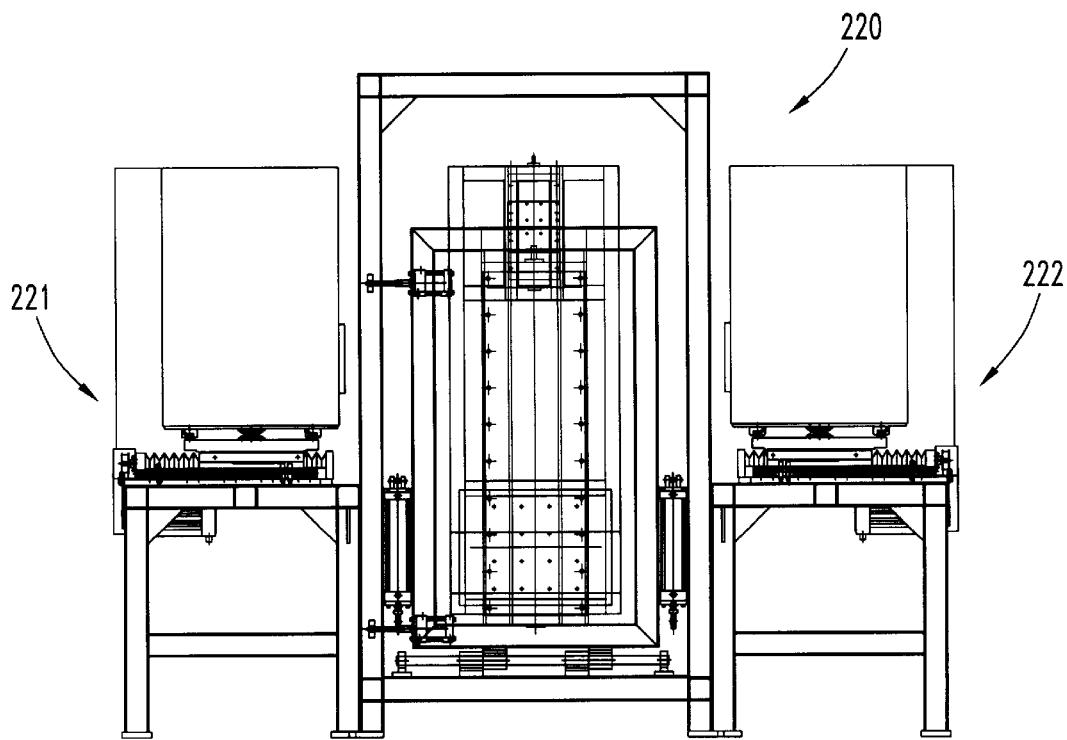
FIG. 16 is a diagrammatic, front elevational view of the FIG. 15 induction hardening apparatus.
Figure 17:
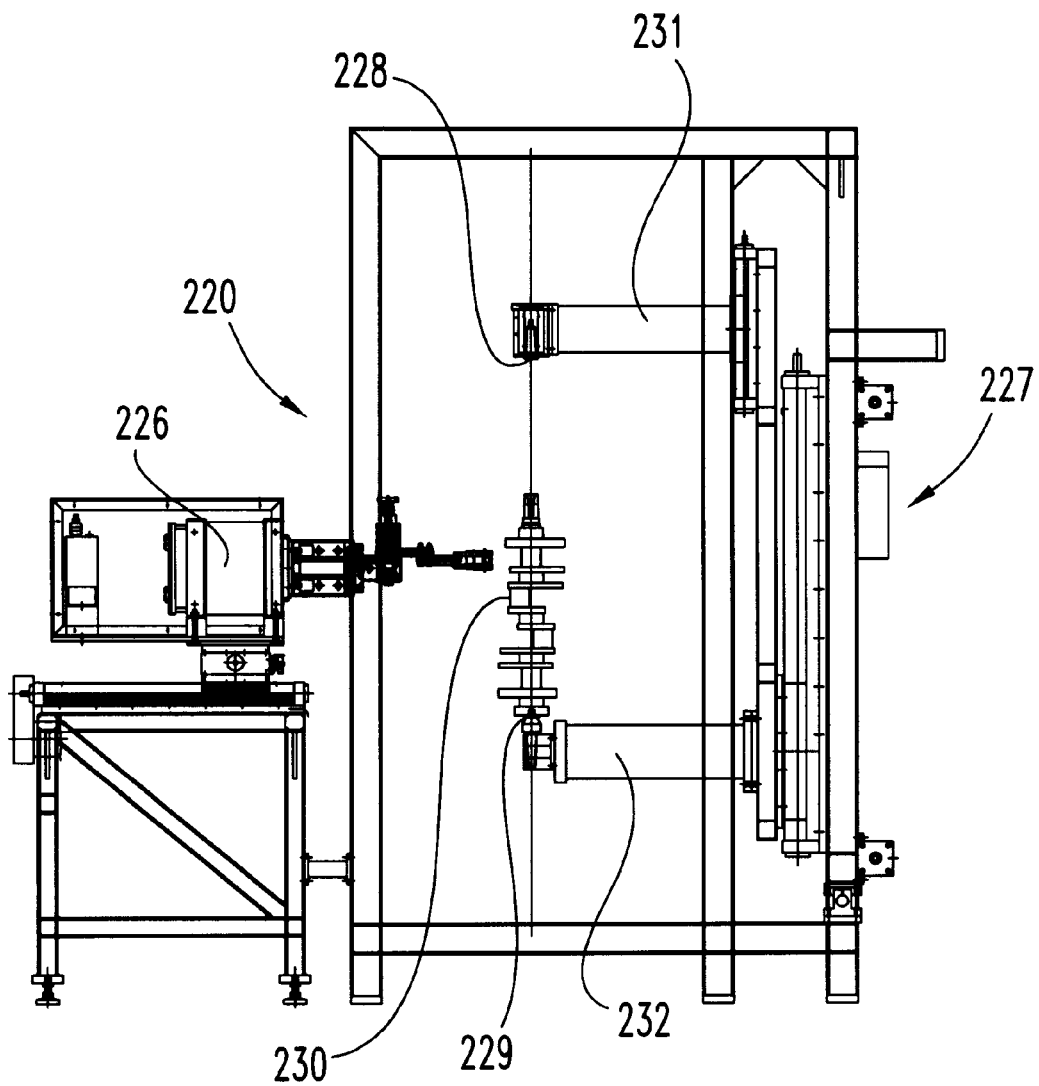
FIG. 17 is a diagrammatic, side elevational view of the FIG. 15 induction hardening apparatus.

A further combination of features for the present invention is illustrated in FIGS. 15, 16, and 17 wherein a single workstation is constructed and arranged to induction harden both pins and bearing surfaces. A single coil assembly is used for the pins and two sets of coil assemblies are used for the bearing surfaces, similar to what is disclosed in FIGS. 12 and 13. There is a single vertical positioning system and, in effect, a single spindle which is common to all three series or sets of coil assemblies which are positioned by means of X-axis and Y-axis positioning mechanisms.

While one embodiment of the present invention is directed principally to the design of the induction coil assemblies and the drive systems which allow the coil assemblies to precisely track the orbit of each pin of the crankshaft workpiece, there are other design features of apparatus 20 which are of importance, including the associated equipment, positioning of the crankshaft workpiece, the design of the workstations, and the automated nature of the entire apparatus. Additional embodiments of the present invention provide variations as to the speed of rotation of the crankshaft and the rate of travel of the coil assembly during a single cycle (i.e., revolution), variations to the power supply output, and the shape of the path of travel of the coil assembly. What is important to understand with regard to the first embodiment of the present invention is that as the crankshaft is rotated in a vertical orientation on a lower center, each of the pins and each of the bearings generate a particular orbit or path of travel. When a coil assembly is positioned adjacent to a particular pin for inductively heating and quench hardening, the coil assembly is moved in an X/Y direction so as to track or trace the same orbit without contacting any portion of the crankshaft. In another, related embodiment of the present invention, the speed of rotation of the crankshaft and accordingly the speed of travel of the tracking coil assembly changes, accelerates and/or decelerates, during each cycle in order to accommodate or adjust for heat loss due to counterweights. In a still further embodiment of the present invention, the orbit or tracking path of the coil assembly is designed to change the spacing between the coil portion of the coil assembly and the crankshaft pin in order to adjust for heat loss due to the presence of the counterweights and thereby achieve a uniformity of case depth. The adjustment for counterweight heat loss can also be achieved by rapidly changing the kW output of the power supply. While reference has been made to the heat loss caused by the counterweights, the corresponding adjustments represented by the alternate embodiments can be practiced whenever there is a structure or any other reason which affects the balance of mass (heat balance) adjacent the pins (or pin) of the crankshaft.

Further, if the bearing surfaces which are coaxial with the longitudinal axis of rotation of the crankshaft include some type of heat sink or heat variable, then adjustments can be made to offset or compensate for any heat loss from that surface selected for induction hardening. If the corresponding induction coil remains stationary, the forms of heat loss adjustment for the bearing surfaces include a speed adjustment by accelerating and decelerating and a power output adjustment by varying the output power of the coil assembly, depending on the position of the heat sink or heat loss component or structure. The description of these two adjustments for the pins are depicted diagrammatically in FIG. 7A. When bearing surfaces are involved instead of pins, the coil assembly 63 is positioned around a corresponding bearing surface, such as bearing surface 28a. It is to be noted that coil assembly 48 is for the pins while coil assembly 63 is used for the bearing surfaces. With the coil assembly 63 so positioned, the speed adjustment and the power output adjustment are performed for the bearing surfaces in the same manner that these adjustments were performed for the pins.

If the induction coil assembly 63 is allowed to shift in the Y-axis direction (only), then the coil assembly positioning adjustment (see FIG. 7B), which is an option for the pins, can be used for the bearing surfaces. Here again, the coil assembly 63 is positioned around the bearing surface such as bearing surface 28a and the coil assembly moves in and out (Y-axis direction) in order to change the spacing between the inner surface of the coil portion and the bearing surface. The closer the inner surface is to the bearing surface, the greater the amount of heat which is generated in the bearing surface.

With continued reference to the first embodiment, by precisely entering dimensional and positional data into a servodrive system, the present invention moves the induction coil assembly in a way to maintain substantially uniform spacing between the inner surface of the coil assembly and the outer surface of the particular pin. Since the bearing surfaces are coaxial with the vertical centers, the "orbit" of each bearing surface is on-axis and all bearing surface orbits are the same. Accordingly, the induction coil assemblies of the present invention as well as the coil positioning systems are described as being "contact-free" because they do not contact the surfaces of the crankshaft which are to be induction hardened.

Figure 2:
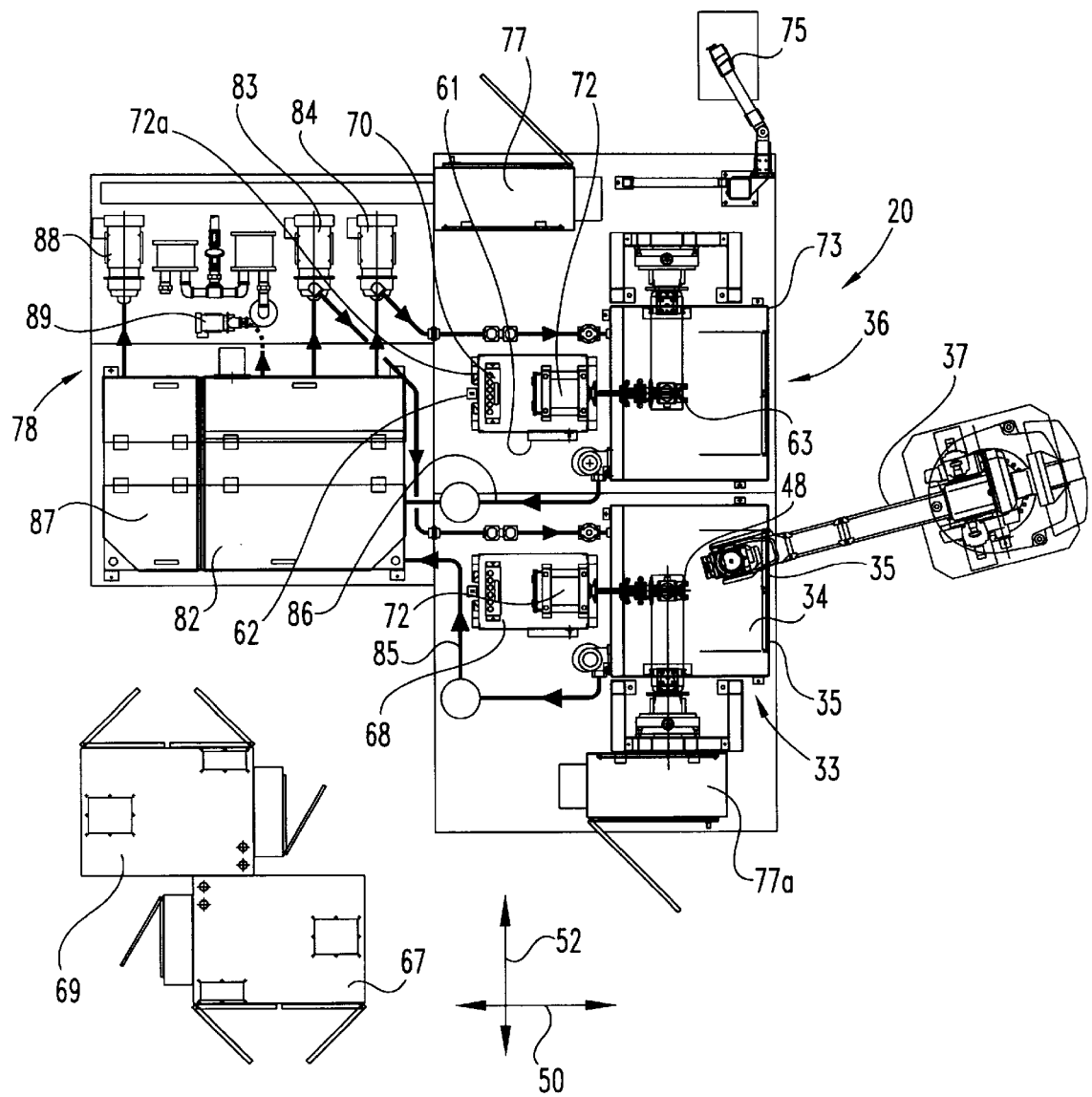
FIG. 2 is a top plan view of the FIG. 1 induction hardening apparatus.
Figure 3:
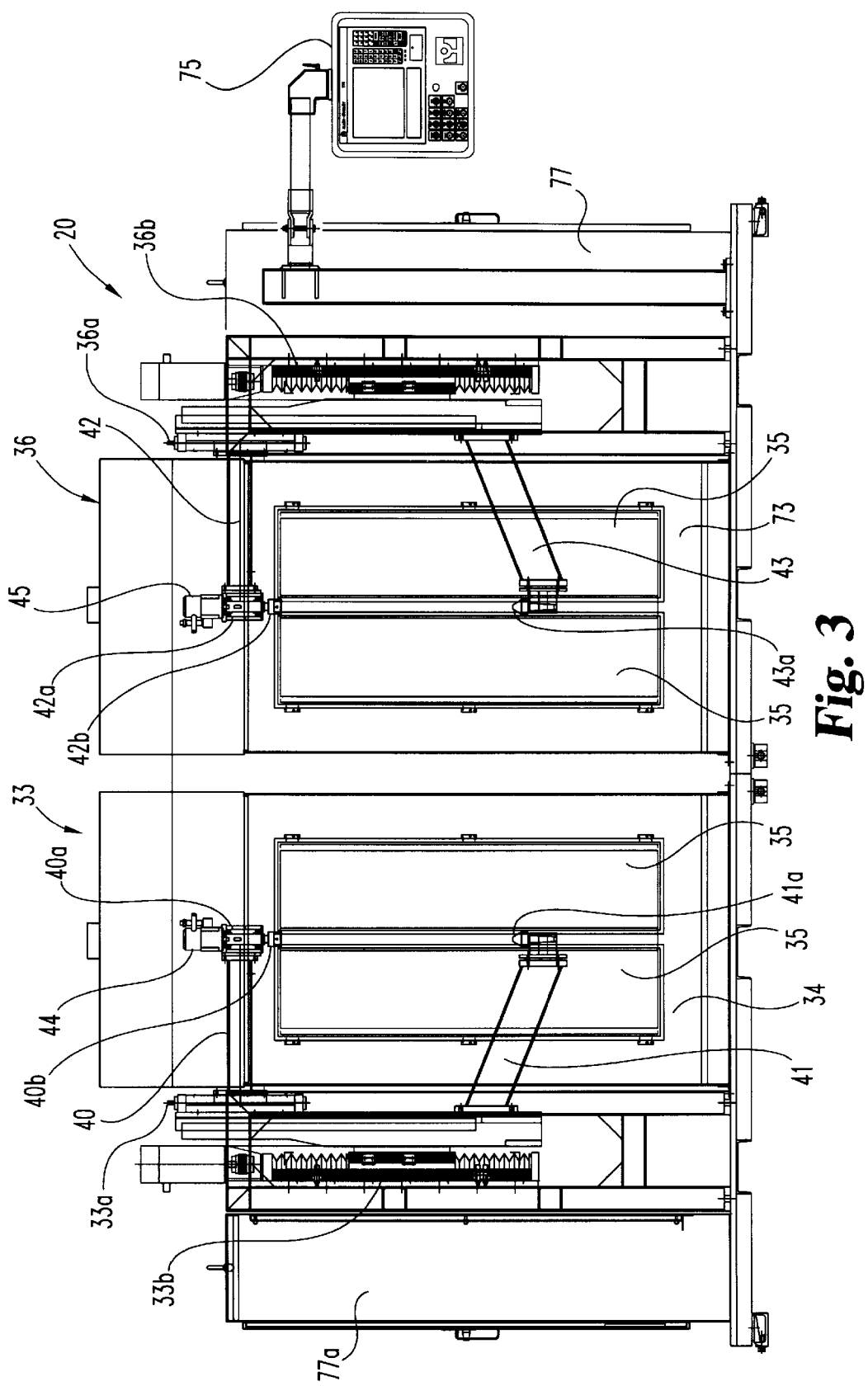
FIG. 3 is a front elevational view of the FIG. 1 induction hardening apparatus.

With regard to FIGS. 1, 2, 3, and 4, FIG. 2 is a complete top plan view of apparatus 20. The remaining figures each have some portion removed for drawing clarity. In FIG. 1, portions of the controls, frame, and drive spindle have been removed for drawing clarity. In FIG. 3, the crankshaft, system components, and robot have been removed for drawing clarity, while in FIG. 4, the human/machine interface (HMI) has been removed. Consequently, these four figures should be considered together as a complementing set.

Based on the illustrations of these drawing figures, induction hardening apparatus 20 includes a first workstation 33 located within an enclosure 34 with front-side access doors 35 and a second workstation 36 of a similar construction. The two workstations are illustrated with doors 35 closed, but with the arms, centers, drives and bearings illustrated. Therefore, FIG. 3 should be regarded as diagrammatic with regard to what it illustrates behind the closed doors 35. At the first workstation, the pins 27a–27d of a first crankshaft are inductively heated and quench hardened. In one embodiment a single coil is used and the pins are sequentially induction hardened. In a related embodiment, see FIGS. 2A and 3A, two pins are able to be induction hardened simultaneously. This requires the use of two coil assemblies and a design whereby pins 27a and 27c are induction hardened together and then subsequently pins 27b and 27d are induction hardened together (i.e., simultaneously).

At the second workstation 36, the pins of a second crankshaft are inductively heated and quench hardened. In essence the two workstations 33 and 36 are of virtually identical construction and are used concurrently to induction harden two separate crankshafts. The crankshafts at the two workstations have not been illustrated in FIG. 3 for drawing clarity. The two crankshafts which are induction hardened at the two workstations 33 and 36 are loaded and unloaded by means of robot 37. If a second apparatus 30 is present for the induction hardening of the bearing surfaces of the two crankshafts, then the crankshafts are also moved to the bearing surface apparatus 30 by a robot mechanism such as robot 37. At this second apparatus location, the bearing surfaces 28a–28e are inductively heated and quench hardened. When completed, the robot 37 removes the crankshafts and loads the next crankshafts into position at the first apparatus.

With continued reference to FIGS. 2 and 3, the processing of crankshaft 21 at workstation 33 will be described in detail. It should be understood that the structure of workstation 36 is virtually identical when induction hardening the pins of a second crankshaft. Crankshaft 21 is moved into position at workstation 33 of apparatus 20 and held in the desired vertical orientation by the robot arm until the support arms 40 and 41 at the first workstation 33 (and support arms 42 and 43 at the second workstation 36) take over the vertical positioning and support of the crankshaft 21. Each support arm 40–43 is automatically moved into position based upon programmable logic control circuitry which is used to preprogram the mechanical drive systems and servos associated with each support arm. Each lower support arm 41 and 43 is assembled with a centering spindle tip 41a and 43a, respectively, for insertion into a corresponding center socket in the end of the crankshaft which is loaded into position at the corresponding workstation. The upper support arms 40 and 42 are each assembled with a bearing housing 40a and 42a, respectively, and a cooperating chuck 40b and 42b, respectively, which is used to lock onto the upper end of the crankshaft. The fixturing of the crankshaft in this manner maintains a true vertical orientation and provides a true vertical axis for rotation of the crankshaft on its longitudinal centerline which is concentric with the geometric centerline axis of each cylindrical bearing surface 28a–28e.

While the axial position of each upper arm 40 and 42 during the steps of inductive heating and quench hardening is the same for each crankshaft, regardless of the size or length, lower arms 41 and 43 are moveable and can be axially shifted to different "run" positions in order to accommodate different crankshaft lengths. Mounted at the end of upper arm 40 is an electric current spindle motor 44 for rotatably spinning the crankshaft at a predetermined rate. A similar electric current spindle motor 45 is mounted at the end of upper arm 42 for spinning rotation at the second workstation. Spinning of the crankshaft is generally beneficial in order to make a uniform and balanced heating pattern in the workpiece, whatever portion might be the focus of the induction hardening. Spinning of the crankshaft is also beneficial for uniform quenching. Since the induction coil assembly used at each workstation of each apparatus as part of the present invention has an open, semicylindrical shape, it is essential that each crankshaft be rotated in order to get complete and uniform heating of the critical portions of the crankshaft. At the first apparatus 20, including both workstations 33 and 36, these critical portions are the pins 27a–27d. At the second apparatus 30, including both workstations 46 and 47, these critical portions are the bearing surfaces 28a–28e.

The following description regarding the first workstation 33 is virtually identical for the second workstation 36. Upper arm 40 is connected to a clamp cylinder 33a (cylinder 36a at workstation 36) which is used to clamp the corresponding crankshaft between chuck 40b and centering spindle tip 41a. The vertical movement of the chucked and centered crankshaft involves the vertical positioning portion 33b (portion 36b at workstation 36) which provides the Z-axis drive. This Z-axis drive is a ball screw servodrive and is used to shift the vertical position of the crankshaft when it is desired to move the crankshaft so that a different pin is positioned adjacent the corresponding induction coil assembly.

In one embodiment of the present invention a single induction coil assembly 48 is located at the first workstation 33 and is securely mounted to a Y-drive system 49 which is controlled by suitable servo circuitry, based upon part geometry and dimensions which are derived from the crankshaft drawings or from other part specifications. System 49 is constructed and arranged to move the induction coil assembly 48 in and out in the direction of arrow 50. Coil assembly 48 is also securely mounted to an X-drive system 51 which is controlled by servodrive circuitry and programmed in a manner similar to that utilized for the Y-drive system 49. System 51 is constructed and arranged to move the induction coil assembly 48 side-to-side in the direction of arrow 52.

The X and Y drive systems 51 and 49 each incorporate servo ball screw tables which actually position the induction coil assembly 48. These two tables are mechanically connected to each other with a ninety (90) degree or right angle relationship as would be understood and expected for X and Y drives. As explained, the crankshaft 21 is in effect mounted on centers 22 and 23 and rotated. In actual practice the upper center 22 takes the form of a chuck 40b. A servomotor (electric current spindle motor) 44 is used to drive the crankshaft and provides rotation data and pin position data to a computer control which is operably connected to the X and Y drive systems 51 and 49. Location data regarding the position of the corresponding pin 27a which is to be inductively heated and quench hardened is fed into the computer control which utilizes a data base program to move the induction coil assembly 48 in a tracking orbit which follows the particular orbit for the particular pin. The computer control program controls the X and Y drive systems and specifically the corresponding servo ball screw tables that position the coil assembly.

Each pin has a particular circumferential location relative to the longitudinal axis of the crankshaft 21. These pin locations coincide with the firing sequence for the cylinders of the engine. While the orbit of each pin is circular and while each orbit is of the same size, the actual location of a particular pin within its circular orbit at any instant of time depends on which pin is being considered and the corresponding cylinder. Accordingly, as the servomotor 44 provides positional data regarding the rotational status of the crankshaft, it is possible to compute a precise and corresponding pin location for each pin 27a–27d of the crankshaft, given that the pin dimensions and angularity are known from crankshaft part specifications and/or crankshaft blueprints or CAD drawings. With this data, it is thus possible to create a tracking orbital path for the induction coil assembly 48 relative to each pin.

Figure 7:
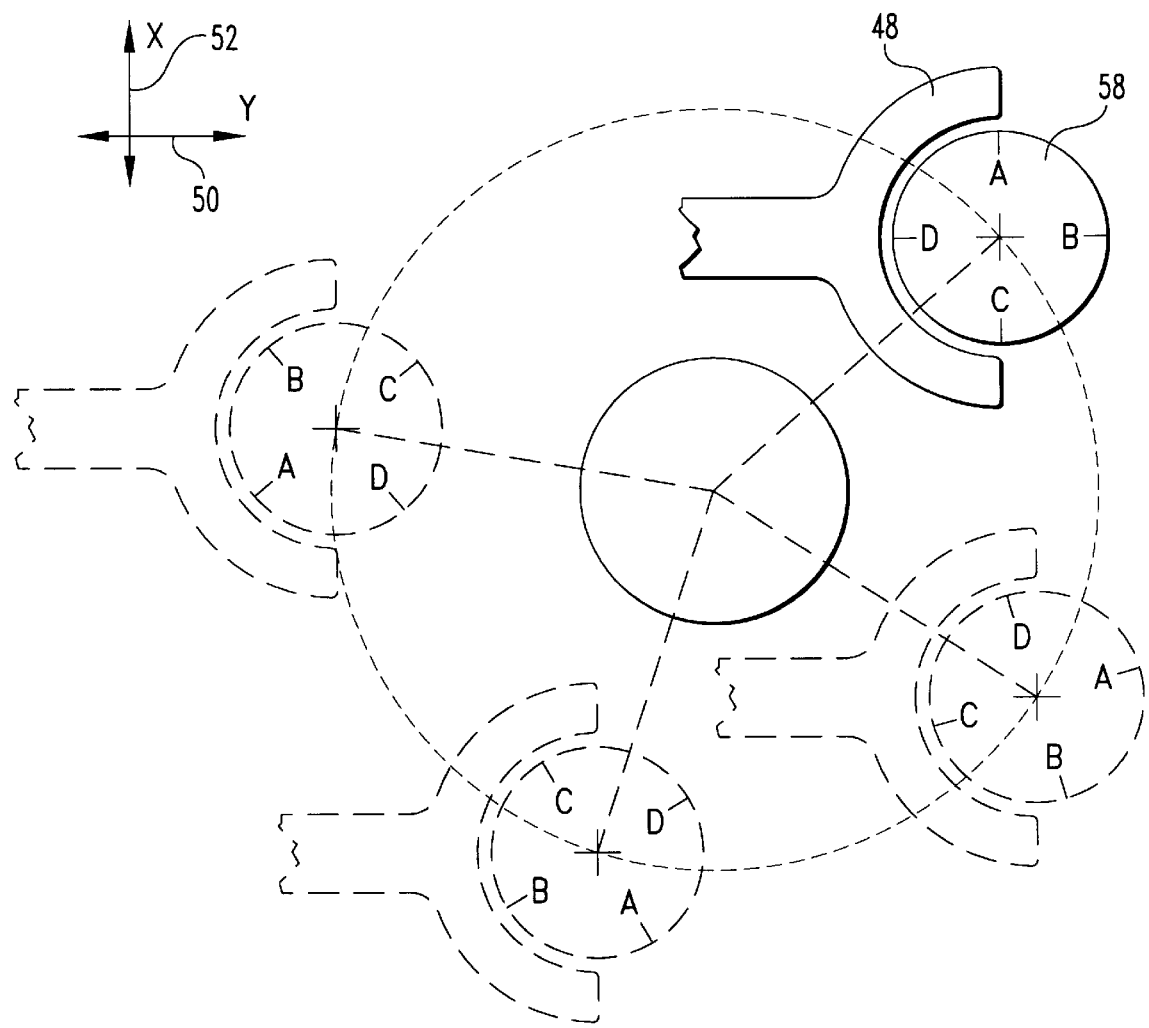
FIG. 7 is a diagrammatic illustration of the orientation of a crankshaft pin during one revolution of the crankshaft.

In the first embodiment of the present invention, the drive systems for the induction coil assembly are programmed to move the coil assembly in an orbit or track which precisely traces or copies the orbit path of the pin which is being induction hardened. This precise tracking by the coil assembly positions the semicylindrical inside surface of the coil portion at a fixed distance of separation (see FIG. 7) relative to the outside diameter surface of the pin.

Figure 6:
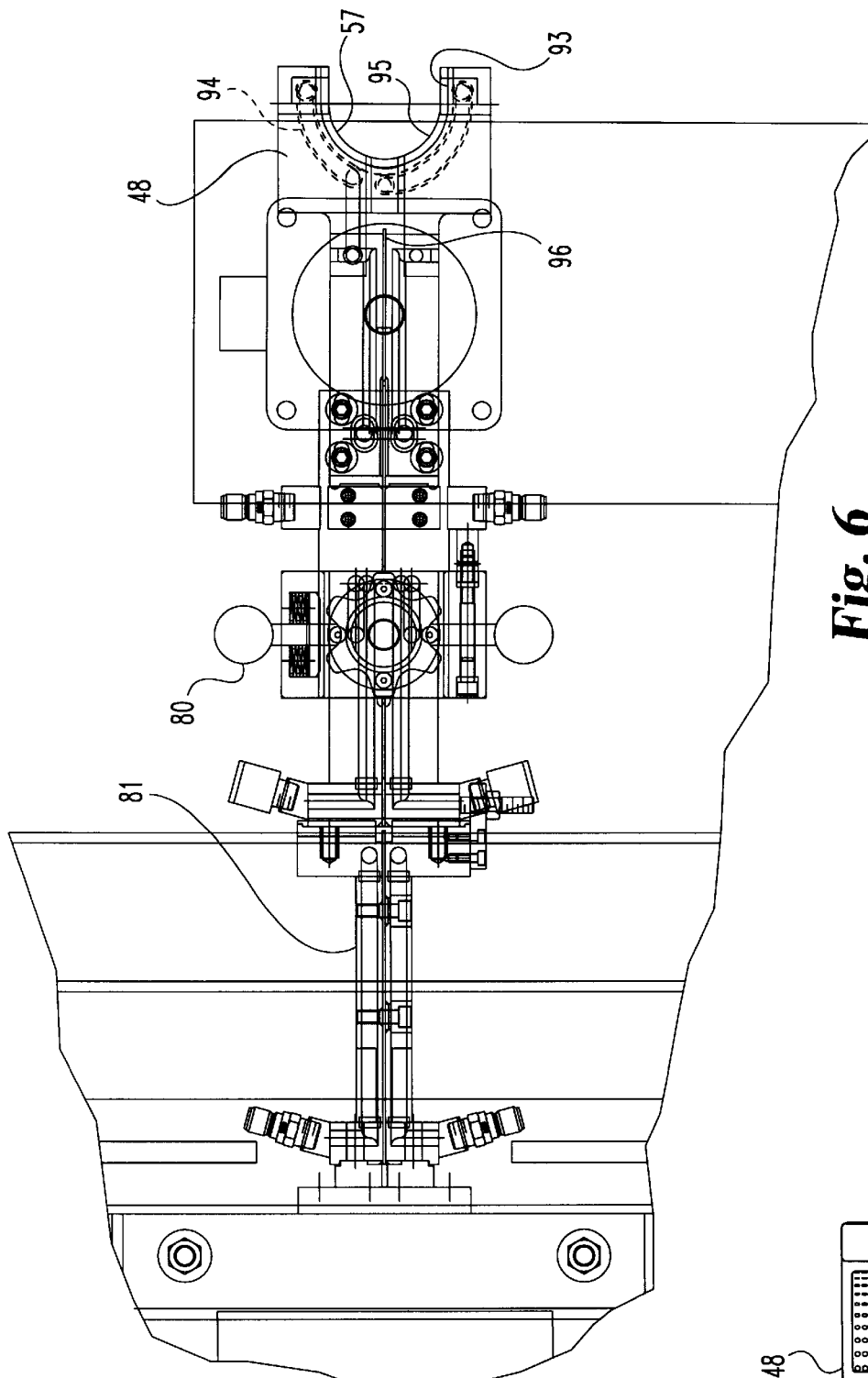
FIG. 6 is an enlarged top plan view of the induction coil at a first workstation comprising a portion of the FIG. 1 induction hardening apparatus.

According to the present invention, the induction coil portion of the coil assembly 48 has a part-circular, semicylindrical shape (see FIG. 6). The inner surface 57 is shaped so as to match the shape of each crankshaft pin, which is cylindrical. By creating coil assembly 48 with one side open, the coil is able to fit around a portion of each crankshaft pin. As the particular pin rotates with the crankshaft, its entire circumference ultimately is placed directly adjacent to the inner surface 57. This positional relationship is diagrammatically illustrated in FIG. 7. Four points A, B, C, and D, located ninety (90) degrees apart have been identified on the surface of cylindrical pin 58 in order to be able to show how these points shift relative to the X and Y directions for the induction coil assembly 48 as represented by arrows 52 and 50, respectively. The description of what occurs at the first workstation 33 of apparatus 20 is duplicated at the second workstation 36 of apparatus 20 when the second workstation is configured for induction hardening pins.

In those situations where counterweights are used and are connected adjacent the pins, there is a heat sink which draws heat away from the pin when the coil assembly is facing that portion of the pin which is closest to the counterweight. As would be understood for an induction hardening apparatus of the type described herein, the heated portion of the pin, or bearing surface, is localized and is that portion which is closest to the semicylindrical inner surface 57 of the coil portion. Consequently, when the coil portion is opposite to the counterweight, there is no noticeable heat sink loss which needs to be addressed by some form adjustment.

In the related embodiments of the present invention, the form of adjustment to compensate for heat loss takes three different forms. In one embodiment of the present invention (see FIG. 7A), the rotation of the crankshaft is varied (accelerate and/or decelerate) in each revolution so that there is a brief dwell or slowing of the rotation rate when the coil portion is adjacent the heat sink portion (i.e. counterweight 58a) of the pin. This dwell generates more heat which compensates for the heat which is lost due to the mass of the counterweights conducting heat away from the subject area.

Figure 7A:
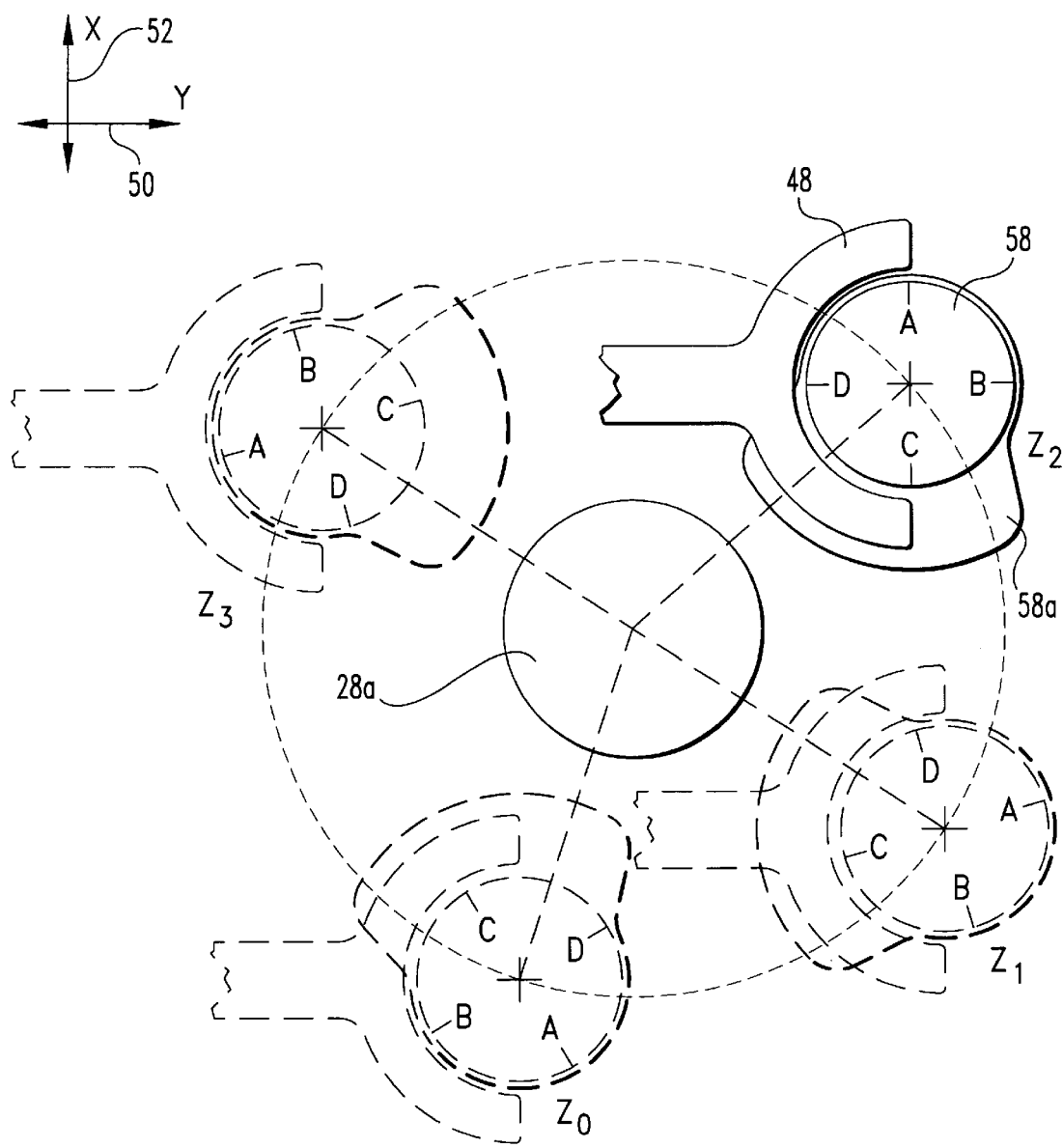
FIG. 7A is a diagrammatic illustration of the orientation of a crankshaft counterweight during one revolution of the crankshaft according to one embodiment of the present invention.

In the FIG. 7A drawing, the location of the counterweight 58a relative to coil assembly 48 is illustrated in four different positions (Z0–Z3) during one cycle which corresponds to one revolution of the crankshaft. As described the speed of rotation ($S_R$) of the crankshaft is varied depending on the counterweight location ($Z_N$) relative to the coil portion of the coil assembly. The coil assembly 48 is diagrammatically illustrated by a semicylindrical coil portion. In the Z1 position, when the coil portion is effectively centered on the counterweight 58a, the speed of rotation ($S_{R1}$) will be the minimum of the entire cycle. This causes the coil portion to remain adjacent this portion of the pin for a longer interval so that more heat is input to the pin. When the coil portion and counterweight 58a are on opposite sides of the pin 58, the $Z_3$ position, the speed of rotation ($S_{R3}$) is at the maximum for the cycle (i.e., one revolution of the crankshaft). This means that the heating interval will be shorter which is appropriate since the counterweight 58a is not going to draw off any significant amount of heat from the pin. In between these two speed extremes, the speed of rotation accelerates and decelerates. The acceleration line from Z1 to Z3 coincides with the deceleration line from Z3 to Z1.

In another embodiment of the present invention, (see FIG. 7B), the coil assembly distance of separation relative to the pin surface is varied or changed slightly during each cycle (i.e., each revolution of the crankshaft). When the coil assembly is on the counterweight side of the pin, it is placed closer to the pin than when the counterweight is on the opposite side of the pin from the coil. By placing the coil portion closer, the heat generated by the coil assembly into the pin is greater at the closer distance. This approach requires that the X and Y drive systems for the coil assembly be controlled so as to sweep a path which is more elliptical than circular.

Figure 7B:
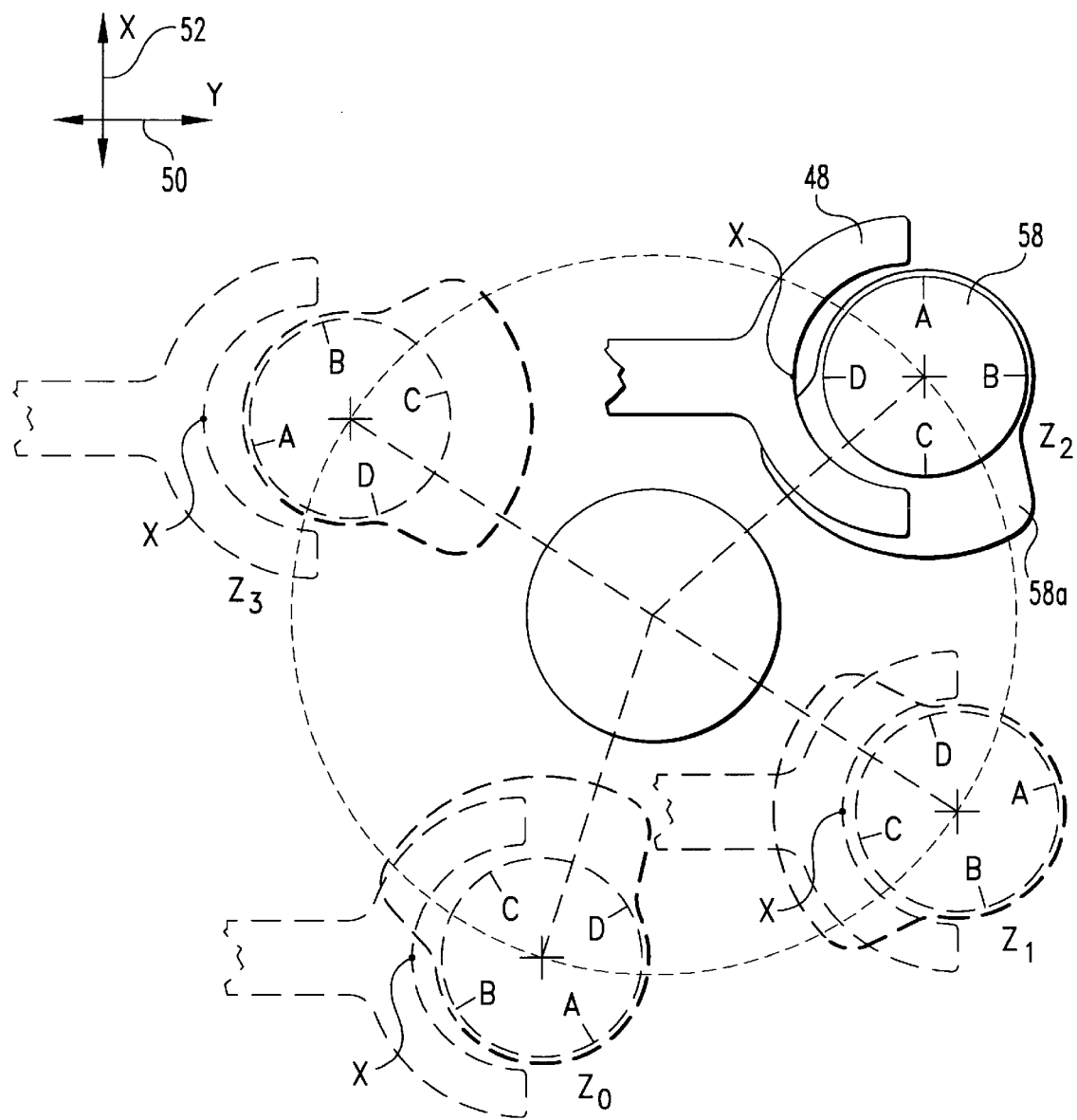
FIG. 7B is a diagrammatic illustration of the orientation of a crankshaft counterweight and the induction coil assembly during one revolution of the crankshaft according to one embodiment of the present invention.

In the FIG. 7B drawing, the location of the counterweight 58a relative to the coil assembly 48 is illustrated in four different positions (Z0–Z3) during one cycle. The positions of FIG. 7B correspond generally to the positions of FIG. 7A. At the Z1 position, the coil portion is at its closest to the pin which generates the greatest amount of heat which compensates for the heat which is lost due to the counterweight acting as a heat sink. At the Z3 position which is 180° from the Z1 position, the coil portion is at its location of greatest separation from the pin. This is the position where the counterweight has the least effect, if any, on the heat reduction due to the counterweight acting as a heat sink.

As the crankshaft rotates and the pin 58 moves through position Z2 from Z1 to Z3, the distance of separation between the inner surface 57 of the coil portion and the outside diameter surface of the pin increases. Then when returning from Z3 to Z1 through the Z0 position, the distance of separation decreases.

If a point (X) is marked on the coil portion and its path is traced for one cycle, it will be seen that the tracking orbit is elliptical rather than circular.

In a still further embodiment of the present invention, the path of the coil portion of the coil assembly is circular, the rate of rotation is constant, and the separation distance remains constant. However, the power output (kW) of the power supply for the coil assembly is varied depending on the position of the crankshaft and accordingly depending on where the coil portion is positioned relative to the orientation of the pin and the counterweight location. The FIG. 7A drawing is suitable to diagrammatically illustrate the rotation of the pin and counterweight when the power output is varied. In the Z1 position, the power output is the greatest due to the counterweight location. In the Z3 position, the power output is the lowest due to the counterweight location. The power output decreases from Z1 to Z3 and then increases from Z3 to Z1. Whenever the coil is adjacent the counterweight side of the pin, the power output is increased so as to generate more heat and thereby compensate for the heat which is lost via the counterweight.

It is important to understand that the adjustments which are made by these alternative embodiments are all achievable with the same basic mechanical and electrical structures associated with apparatus 20. All of the adjustments are effected by changing the speed programming of the spindle motor and the tracking speed of the X and Y drive systems or by changing the X and Y travel to vary the spacing or by changing the power output from the power supply.

One important feature of the present invention is that the induction coil assembly is free of any direct physical contact with the crankshaft pin which is being inductively heated and quench hardened. The induction coil assembly is also free of any direct physical contract with all other orbiting features. Likewise, at the second apparatus, the corresponding induction coil assembly is free of any direct physical contact with the crankshaft bearing surface which is being inductively heated and quench hardened. This lack of any contact includes the lack of any sensor or position indicator riding on the surface of the corresponding pin or bearing surface. In this way the coil assembly is not subjected to wear which would significantly reduce or shorten the coil life. By designing an apparatus where there is no contact between the coil portion of the assembly and the surface or portion being induction hardened, coil portion wear is virtually eliminated and coil portion life is noticeably extended. Likewise, since all other portions of the induction coil assembly are free of any contact with the crankshaft portion being induction hardened, there is no wear to these portions and no shortened life. Some of the keys to the success of the present invention include the precise programming of the X and Y movement of the coil, based on the pin orbit and the open, semicylindrical design of the coil portion of the coil assembly. While a vertical crankshaft orientation is preferred, the suitability of the present invention is not limited to a vertical crankshaft. The present invention performs equally well for crankshafts which are horizontally supported between centers.

The first workstation 33 which has been described relative to the coil assembly travel and the induction hardening of the crankshaft pins has a design which is virtually duplicated by the second workstation. The second workstation 36 includes a virtually identical X-drive system 61, a virtually identical Y-drive system 62, the cooperating servo ball screw table set at ninety (90) degrees to each other, and an induction coil assembly 63 with an open, semicylindrical configuration which is virtually identical to coil assembly 48. The servo-motor 45 functions in a virtually identical manner to motor 44 and controls the rotary motion of the corresponding crankshaft. As has been described, the two workstations 33 and 36 of apparatus 20 are constructed and arranged to be virtually identical so that two crankshafts may be processed concurrently, thereby doubling the through put rate. When both workstations 33 and 36 are designed for induction hardening of the crankshaft pins, their construction is virtually identical so that two crankshafts may be processed concurrently.

The primary difference between the first apparatus 20 and the second apparatus 30 is the difference between what portions of the crankshaft are being induction hardened at each apparatus location. At the first apparatus 20, the crankshaft pins are being induction hardened, while at the second apparatus (see FIGS. 8–11) the bearing surfaces are being induction hardened. Since the cylindrical bearing surfaces are coaxial with one another, are of the same cylindrical size, and are centered on the longitudinal axis of the crankshaft, the control of the movement of the bearing surface induction coil assemblies 64a–64e is less complex at the second apparatus 30. The foregoing comparison is applicable whether these two apparata include one, two, or some other number of virtually identical workstations.

With regard to the bearing surfaces 28a–28e which comprise a portion of the crankshaft 65, these surfaces, as indicated, have substantially the same outside diameter and cylindrical shape. Importantly, these cylindrical surfaces are concentric with the longitudinal axis of the crankshaft and accordingly concentric with the longitudinal axis extending between the two supporting centers. As illustrated, the upper center is preferably replaced with a positive lock (chuck). Consequently, because the bearing surfaces do not actually have their own unique orbit, the induction coil assemblies 64a–64e utilized at the workstations of the second apparatus 30 have a fixed position during the rotation of the crankshaft, once each coil assembly is initially set in its desired proximity to the corresponding bearing surface. There still needs to be some type of an X and Y positioning system to initially position each coil assembly adjacent the corresponding bearing surface, but once properly positioned, the induction coil assembly for the corresponding bearing surfaces does not have to be moved or traced in a particular or corresponding orbital path. This is obviously different for the pins due to their off-axis location relative to the crankshaft centerline.

To the extent that the crankshaft 65 can accept the amount of heat to be generated if more than one bearing surface is inductively heated simultaneously, it is possible to use a plurality of coil assemblies 64a–64e at the workstations of apparatus 30. The configuration of apparatus 30, as illustrated in FIGS. 8–11, includes a series of five induction coil assemblies 64a, 64b, 64c, 64d and 64e. The crankshaft 65 which is loaded into position between vertical centers 66a and 66b includes five bearing surfaces and the operation of apparatus 30 inductively heats three of the five bearing surfaces in one operational cycle and the remaining two bearing surfaces in a separate operational cycle (see FIGS. 12 and 13). As has been described, the upper center 66a is preferably a positive lock (chuck) of the style of chuck 40b. Each induction heating step is followed immediately by a quench step. Consistent with the foregoing descriptions, the quench fluid is delivered by way of the induction coils in one embodiment of the present invention. In an alternative embodiment, the quench fluid is delivered by a separate quench mechanism which does not utilize the induction coil assemblies as a delivery device.

Figure 12:
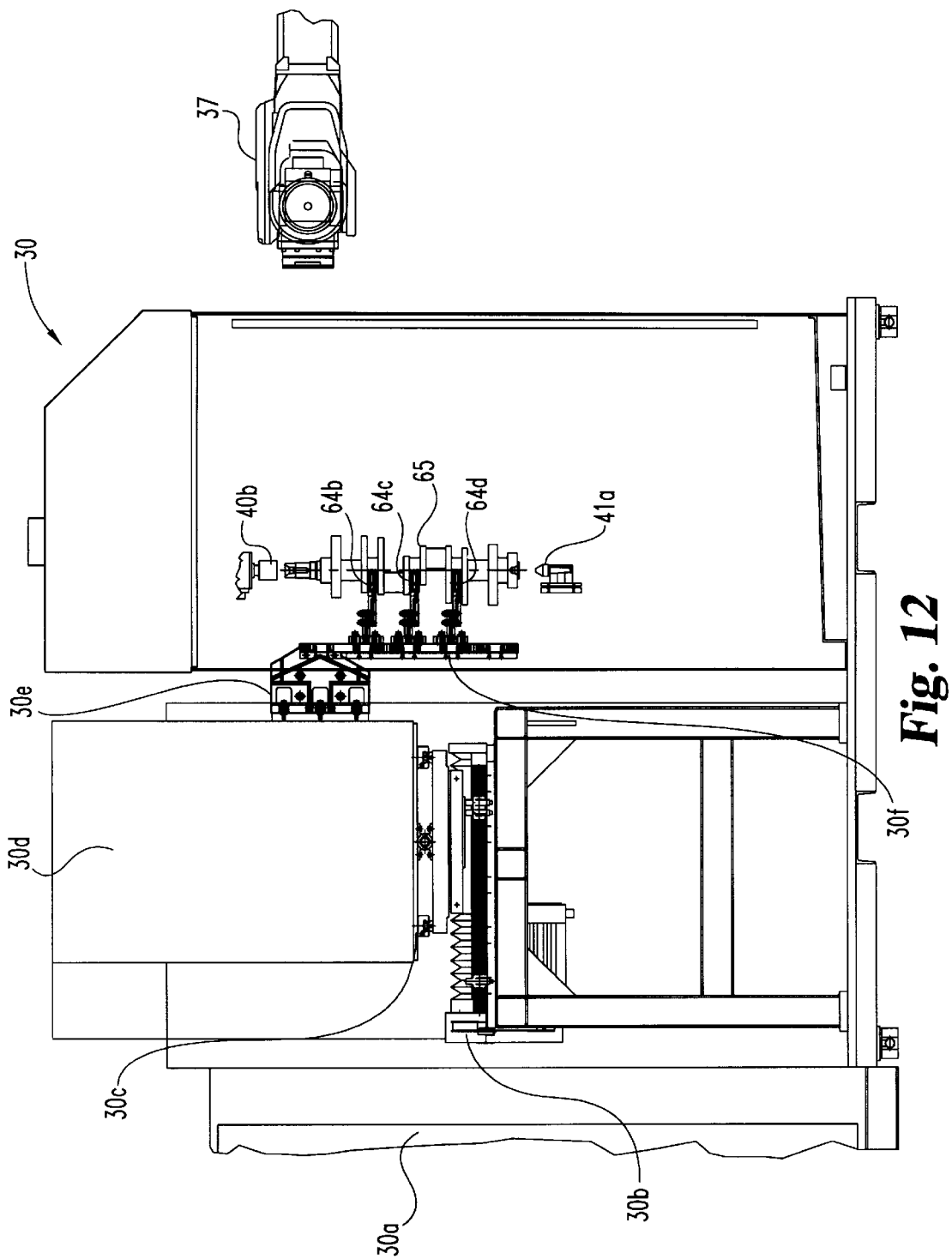
FIG. 12 is an enlarged side elevational view of the crankshaft to be induction hardened by the FIG. 8 induction hardening apparatus.

In the FIG. 8 illustration the five coil assemblies 64a–64e are each illustrated as they would be positioned relative to their corresponding bearing surfaces of crankshaft 65. This arrangement would be used if all five bearing surfaces were to be induction hardened simultaneously. However, since this would generate too much heat, FIGS. 12 and 13 illustrate how three coil assemblies are used first and then how two coil assemblies are used. The order may be reversed, but the point is that by simultaneously heating a fewer number of bearing surfaces, there is less heat generated and less distortion. Whether the two bearing surfaces are inductively heated and quench hardened before or after the other three bearing surfaces, the simultaneous processing of multiple bearing surfaces results in a faster overall completion cycle compared to the processing of one bearing surface at a time. Included as part of apparatus 30 is an inductive power supply 30a, a Y-axis drive system 30b, a slide rail 30c, a transformer assembly 30d, bus bar 30e and bus bar extension 30f. With the exception of the bus bar extension and the slide rail which replaces the X-axis drive system 51 of apparatus 20, apparatus 30 is virtually identical to apparatus 20.

Referring now to FIGS. 15, 16, and 17, a further embodiment of the present invention is diagrammatically illustrated. Apparatus 220 includes three horizontal positioning systems 221, 222, and 223, each of which are connected to a corresponding coil assembly for the pins or to a plurality of coil assemblies for the bearing surfaces. Each positioning system includes X-axis and Y-axis positioning systems which are fixed to each other at a 90 degree angle. For the bearing surfaces (systems 221 and 222), the X-axis positioning system is a manual slide device. Also illustrated is a separate heat station transformer 224, 225, and 226 located adjacent each horizontal positioning system. Apparatus 220 includes all of the standard system components, even though these are not illustrated. These standard system components are illustrated in other drawing figures and are excluded here simply for drawing clarity and due to the fact that the focus of the embodiment of FIGS. 15–17 is on the manner of combining into a single workstation induction hardening subsystems for both the pins and the bearing surfaces. Apparatus 220 further includes a common support system 227 for vertical travel along the Z-axis, an upper chuck 228 and a lower vertical support center 229.

In the illustrated embodiment of FIG. 15, if all three horizontal positioning systems 221, 222, and 223 are in fact used, the common support system 227 (or conceivably one of the horizontal positioning systems) needs to be hinged out of its illustrated position in order to be able to load the workpiece (i.e., crankshaft) into position. Another option is to load the workpiece from the top (i.e., over head). Another option is to use only two of the three horizontal positioning systems and, as a way to illustrate this option, system 222 is outlined with a broken line in FIG. 15.

While some of the components and features have been eliminated in some of the drawings simply for drawing clarity, a complete understanding of apparatus 220 can be gained by the following analysis. The construction of apparatus 220 can be appreciated by noting that positioning system 221 and transformer 224 are substantially the same as what is illustrated in FIG. 12 which controls three coil assemblies that are used to simultaneously induction harden three bearing surfaces. Positioning system 222 and transformer 225 are substantially the same as what is illustrated in FIG. 13 which controls two coil assemblies that are used to simultaneously induction harden two bearing surfaces. Positioning system 223 and transformer 226 are substantially the same as what is illustrated in FIG. 5 which controls one coil assembly that is used to sequentially induction harden the pins of crankshaft 230. The coil assemblies include assemblies 221a, 221b, and 221c for system 221, assemblies 222a and 222b for system 222, and assembly 223a for system 223.

In FIG. 16 the bearing surface coils 221a, 221b, 221c, 222a, and 222b are not illustrated nor is positioning system 223. In FIG. 17 positioning system 223 is illustrated but the two bearing surface positioning systems 221 and 222 are omitted for drawing clarity. The support arms 231 and 232 are configured the same as arms 40–43 as would be expected consistent with the description of FIGS. 15–17. In all respects the operation of apparatus 220 is the same as the operation of the corresponding portions of apparata 20 and 30. The differences include the use of a single vertical positioning system for the crankshaft in combination with horizontal (slide) positioning systems that position coils for both pins and bearing surfaces at the same single workstation.

It is also an option with the present invention to configure apparatus 20 and workstations 33 and 36 with multiple induction coil assemblies, each with its own servodrive system, its own X and Y drive systems, and control circuitry. This allows the simultaneous processing of multiple pins of one crankshaft. If two workstations are configured and utilized as part of apparatus 20, then each workstation can be configured with multiple induction coil assemblies for the crankshaft pins.

Figure 2A:
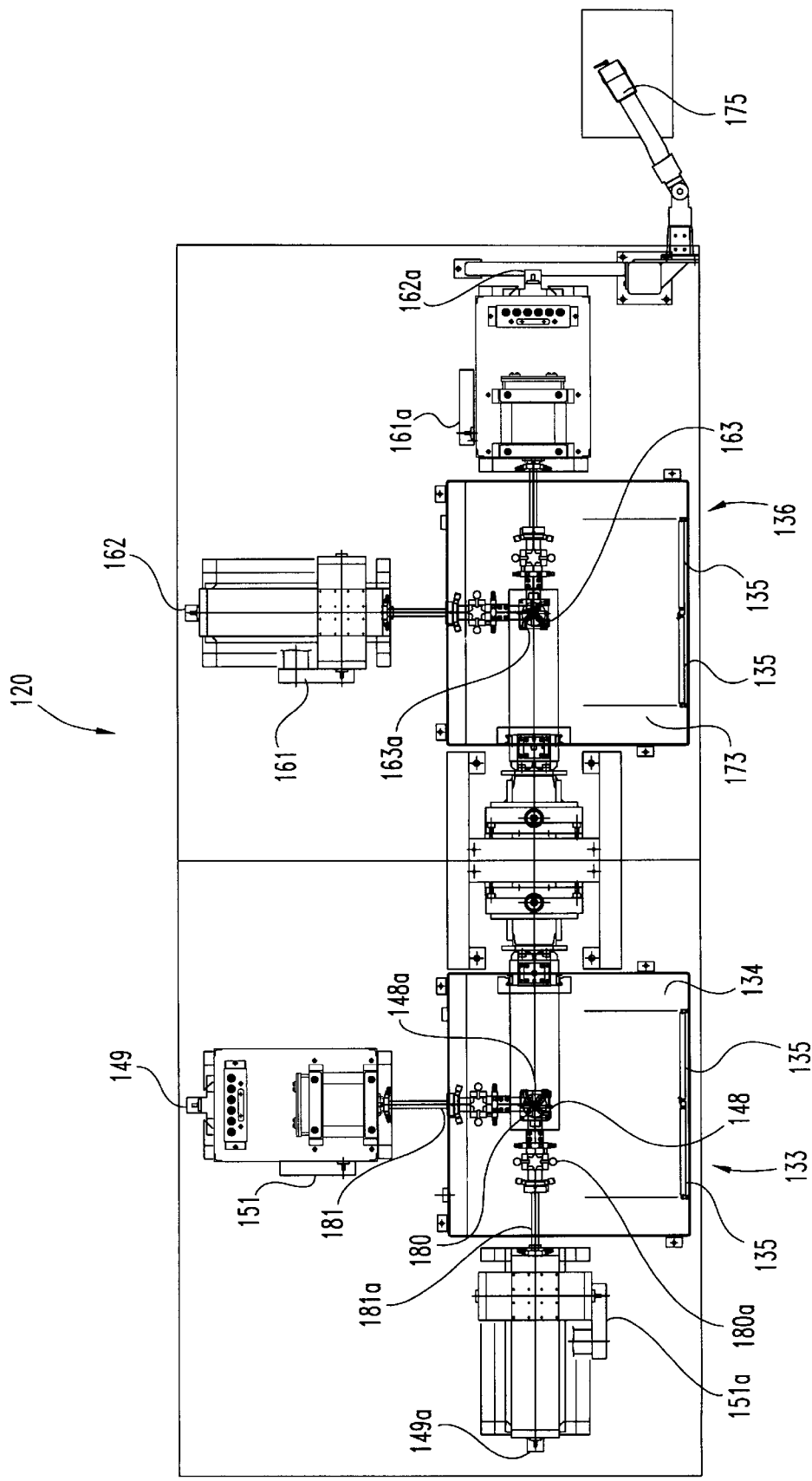
FIG. 2A is a top plan view of an induction hardening apparatus according to an alternate embodiment of the present invention.
Figure 3A:
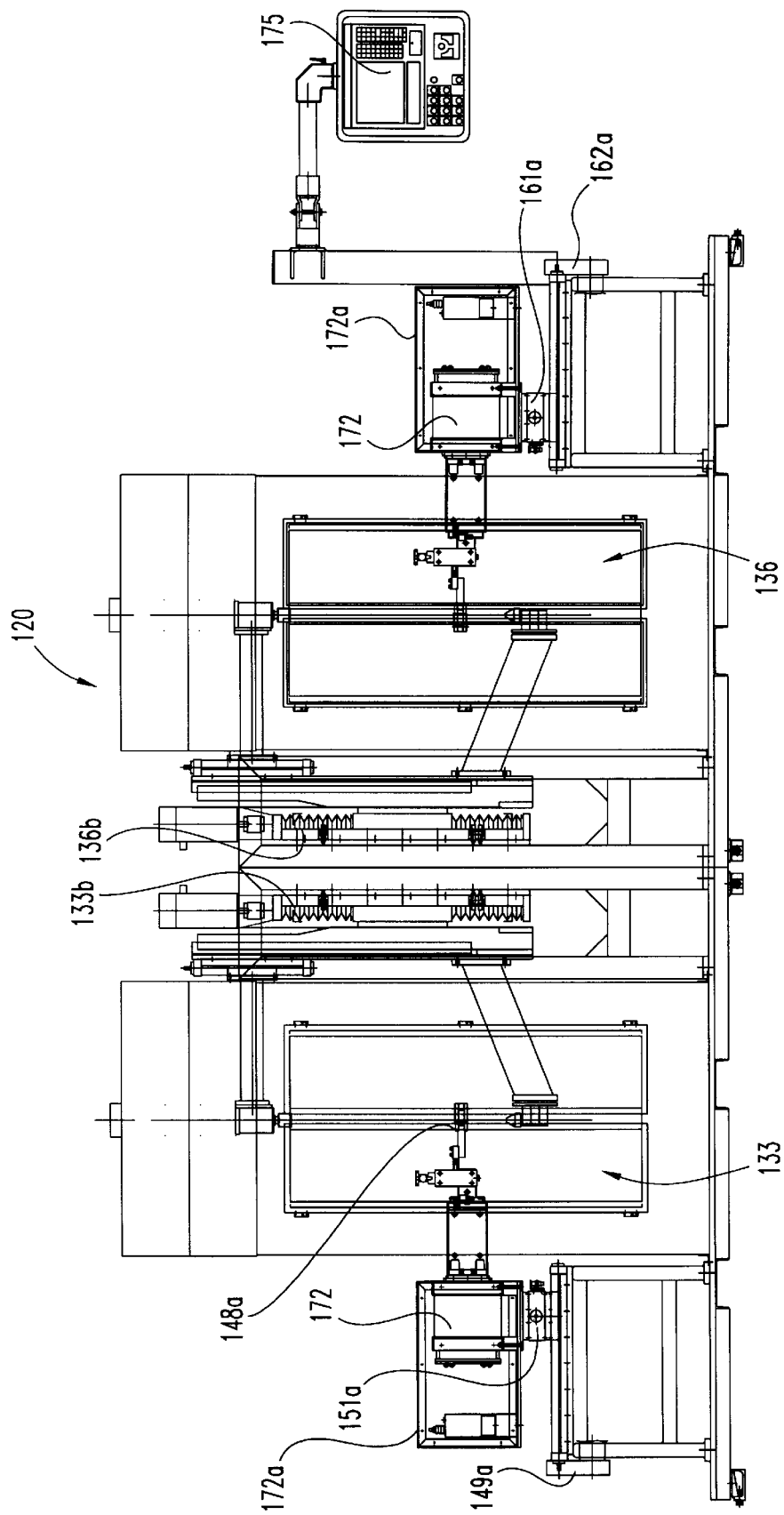
FIG. 3A is a front elevational view of the FIG. 2A induction hardening apparatus.
Figure 4:
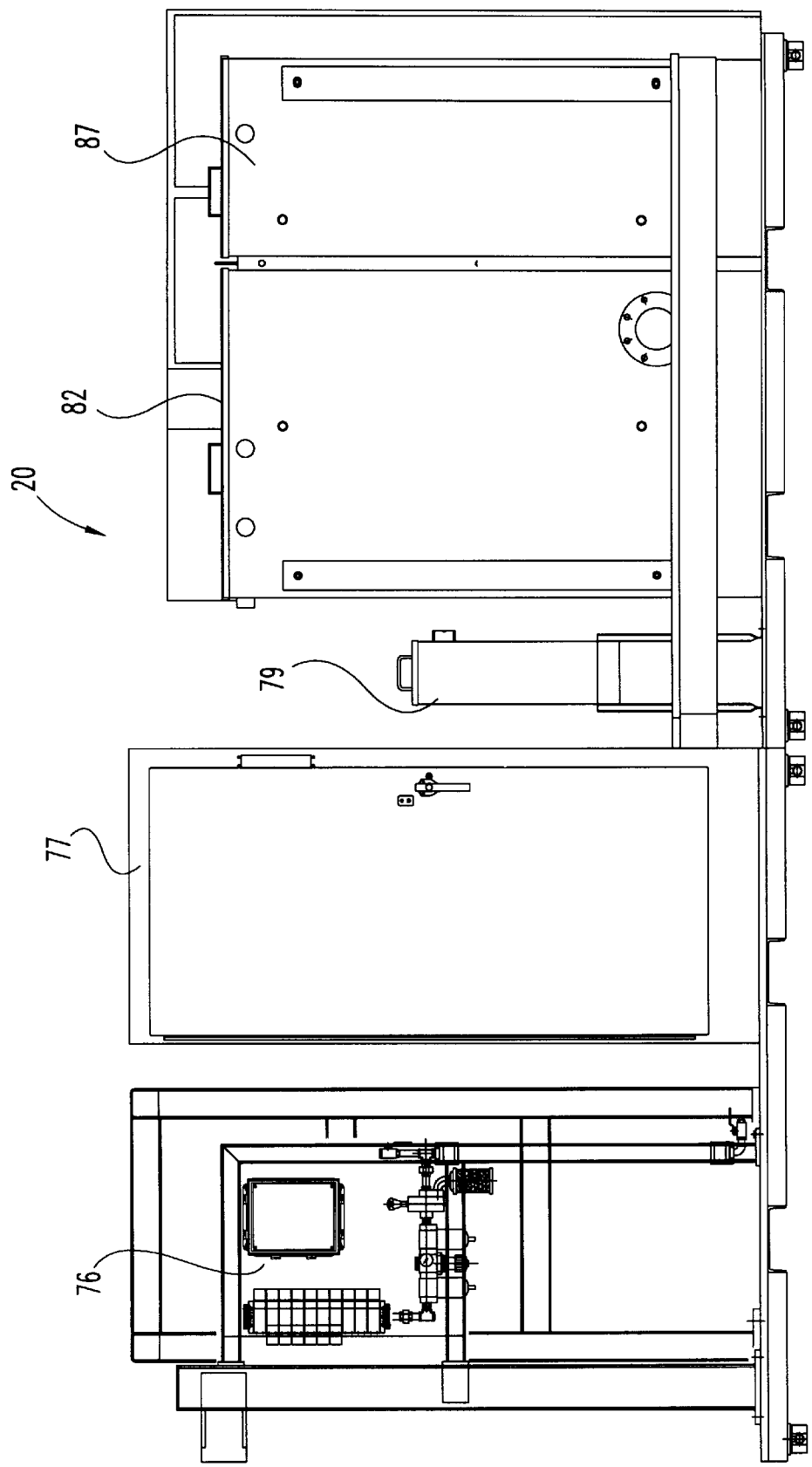
FIG. 4 is a right side elevational view of the FIG. 1 induction hardening apparatus.

Referring now to FIGS. 2A and 3A, apparatus 120 is illustrated with workstations 133 and 136. In view of the fact that apparatus 120 is virtually identical to apparatus 20, though with the addition of a second coil assembly and cooperating drive systems, the corresponding reference numerals have been given a 100 number prefix. Accordingly, workstation 133 is intended to be virtually identical to workstation 33 and similarly, workstation 136 is intended to be virtually identical to workstation 36.

One of the differences between apparatus 20 and apparatus 120 includes the relocating of the vertical position portions 133b and 136b (33b and 36b for the two workstations 33 and 36), respectively, to the space between the two workstations 133 and 136. This makes the left side of one workstation 133 and the right side of the other workstation 136 open so that second X and Y drive systems 151 a and 149a and 161a and 162a, respectively, can be installed as illustrated in FIGS. 2A and 3A. The second X-Y drive arrangement at workstation 133 is virtually identical to the arrangement of the X-drive system 151 and the Y-drive system 149. Likewise the second X-Y drive arrangement at workstation 136 is virtually identical to the arrangement of the X-drive system 161 and the Y-drive system 162. With regard to the four X-Y drive arrangements which are illustrated, each one includes an X-axis drive system, a Y-axis drive system, a transformer, and a transformer housing. In order to illustrate all of these component parts, the drawings have been diagrammatically adjusted to remove the transformer from two locations to better show the X and Y drives.

Like the first X-Y drive arrangement located at workstation 133, the second X-Y drive arrangement is connected to an induction coil assembly 148a via a bus bar 181a and quick-change device 180a. The first X-Y drive arrangement is connected to coil assembly 148 via bus bar 181 and quick-change device 180. By providing a second induction coil assembly 148a with all of the cooperating structures and drive systems, at each workstation, two pins can be induction hardened simultaneously. In order to distribute the heat, pins 27a and 27c (1st and 3rd pins) are induction hardened during the first cycle. Thereafter, pins 27b and 27d (2nd and 4th pins) are induction hardened during the second cycle. By doubling the number of induction coil assemblies, the induction hardening cycle time for the pins of the crankshaft is able to be cut in half. This may be accomplished by varying the power during the cycle. If the speed is varied, then the counterweights must be timed to the positions of both coils. This may not be possible for all crankshafts.

Additional components and systems illustrated in FIGS. 2A and 3A which have counterparts in FIGS. 1, 2, 3, 4, 5, and 6 include the human/machine interface 175, induction coil assemblies 163 and 163a, doors 135, enclosure 173, transformer 172, transformer housing 172a, and enclosure 134.

Depending on the specific crankshaft design and the various cycle times, the use of multiple coil assemblies at each workstation and the use of multiple workstations may be more advantageous for some crankshaft designs than for others. The planning of the design of each apparatus, including the number of workstations and the design of each workstation, should be performed with an appreciation of the type of crankshafts to be run so that the cycling of the crankshafts from apparatus to apparatus is efficient and cost effective.

Another factor to consider is the tolerances to be maintained. If a plurality of bearing surfaces are induction hardened simultaneously, there could be some slight distortion requiring a subsequent grinding operation. There is not a distortion concern when only one pin at a time is induction hardened. For this reason, one might want to complete the induction hardening of all bearing surfaces and bring the crankshaft back into tolerance before initiating the induction hardening of the crankshaft pins.

With continued reference to FIGS. 1, 2, 3, 4, 5, and 6, some of the standard system components associated with each apparatus are illustrated. Induction hardening apparatus 20 includes for the first workstation 33 a 300 kW/10 kHz inductive power supply 67 and a compound precision horizontal slide 68 providing the X and Y drive systems 51 and 49, respectively. Duplicate equipment is provided for the second workstation 36 including inductive power supply 69 and horizontal slide 70. Slide 70 provides X and Y drive systems 61 and 62. Each workstation 33 and 36 also includes a heat station transformer 72 and transformer housing 72a. Enclosures 34 and 73 are provided to enclose the crankshafts and coils at each workstation. Apparatus 20 includes certain components and systems which interface with both workstations including human/machine interface 75, various pneumatics and controls 76, a main control enclosure 77, positioning control enclosure 77a, and a fluids system 78. Also included is a quench filter 79, quick change device 80 for each coil assembly, and bus bar 81. The main control enclosure 77 includes the computer and PLC controls, logic circuitry, running controls, breakers, and input/output circuitry for the apparatus. Enclosure 77a includes the circuitry for the positioning control devices.

With specific reference to FIG. 2, an 800 gallon quench water tank 82 is flow coupled to two 15 HP quench pumps 83 and 84. Pump 83 is coupled by a flow line to the first workstation 33 while pump 84 is coupled to the second workstation 36. Return lines 85 and 86 return the quench water which is used at each workstation and collected back into the quench water tank 82. Distilled water tank 87 contains a supply of distilled water for cooling of the electrical components. Pump 88 is used to deliver distilled water from tank 87. Pump 89 is a recirculating pump for cooling purposes only. Each induction coil assembly 48 and 63, in one embodiment of the present invention, is configured with a series of flow openings positioned around its inner surface for the rapid delivery of quench water to the inductively heated portions of the crankshaft, whether those portions include a pin or bearing surface (see FIG. 6A). By configuring the coil assemblies with a quench capability, there is no need to move the induction coil assembly and either position the crankshaft at a quench station or move a separate quench system into position. The combining of the inductive heating and quench hardening steps in a single coil assembly is one option for the present invention. Additionally, the use of a separate quench system is contemplated as a very viable part of the present invention due to the availability of excellent quench system technology. The use of a separate quench system is beneficial whenever the coil assembly design is to be simplified or when there is a desire to shorten the cycle time.

As has been described, the quench capability or function is performed in one embodiment of the present invention by flow holes machined directly into the induction coil assembly. These flow holes are connected to flow lines which are connected to the corresponding quench pump, see FIG. 2. In the alternative embodiment when a separate quench mechanism is used, the same flow lines are connected to the quench mechanism.

The actual quench step is preferably performed in stages. The first stage is while the crankshaft is still rotating immediately after the pin or bearing surface has been raised to the desired temperature. When a secondary or supplemental quench is performed, this occurs at a different Z-axis location and requires a vertical shift of the crankshaft. While the supplemental quench is being performed, the next pin is able to be positioned relative to the induction coil assembly for processing. This doubling up of different functions helps to reduce the overall cycle time for the crankshaft.

Figure 9:
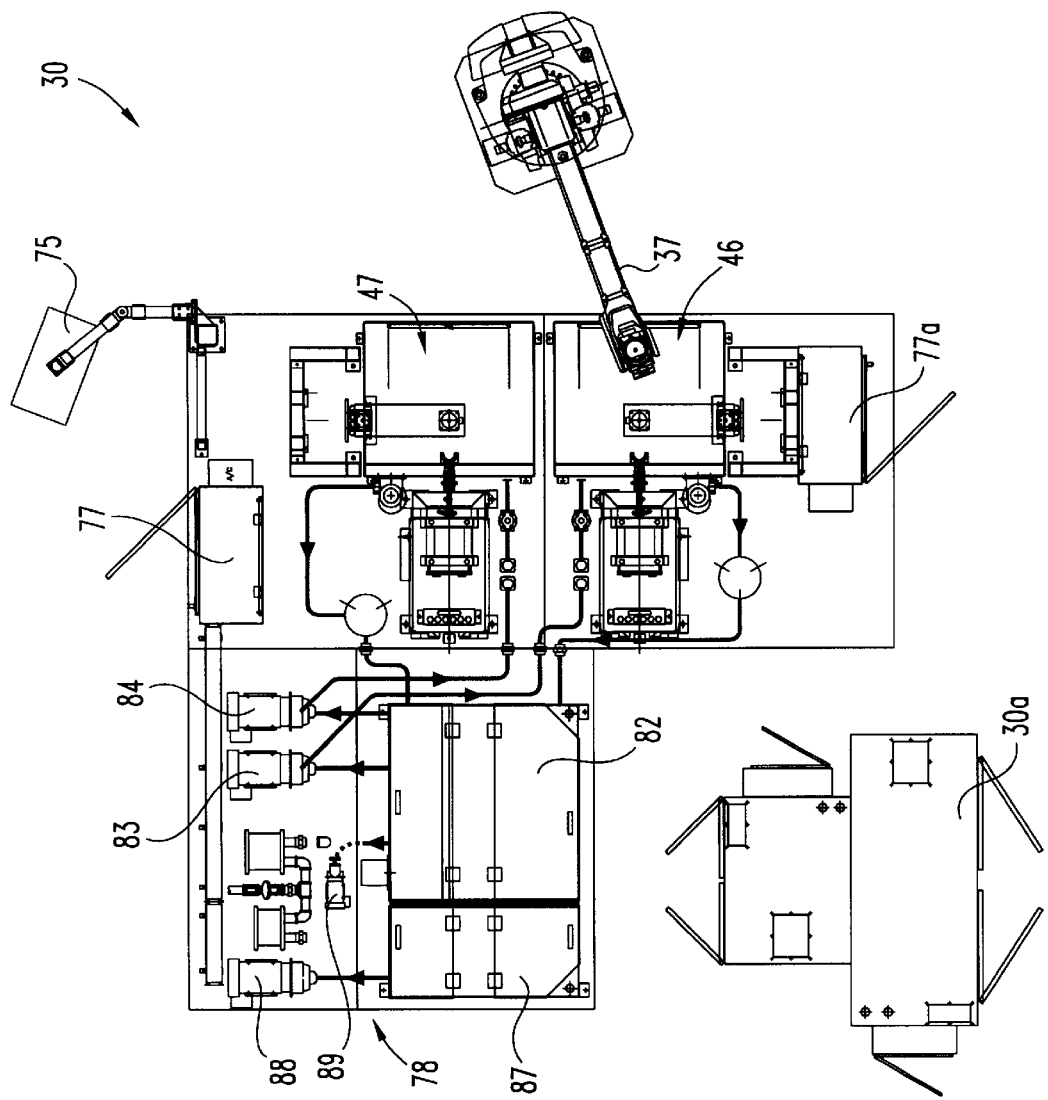
FIG. 9 is a top plan view of the FIG. 8 induction hardening apparatus.
Figure 10:
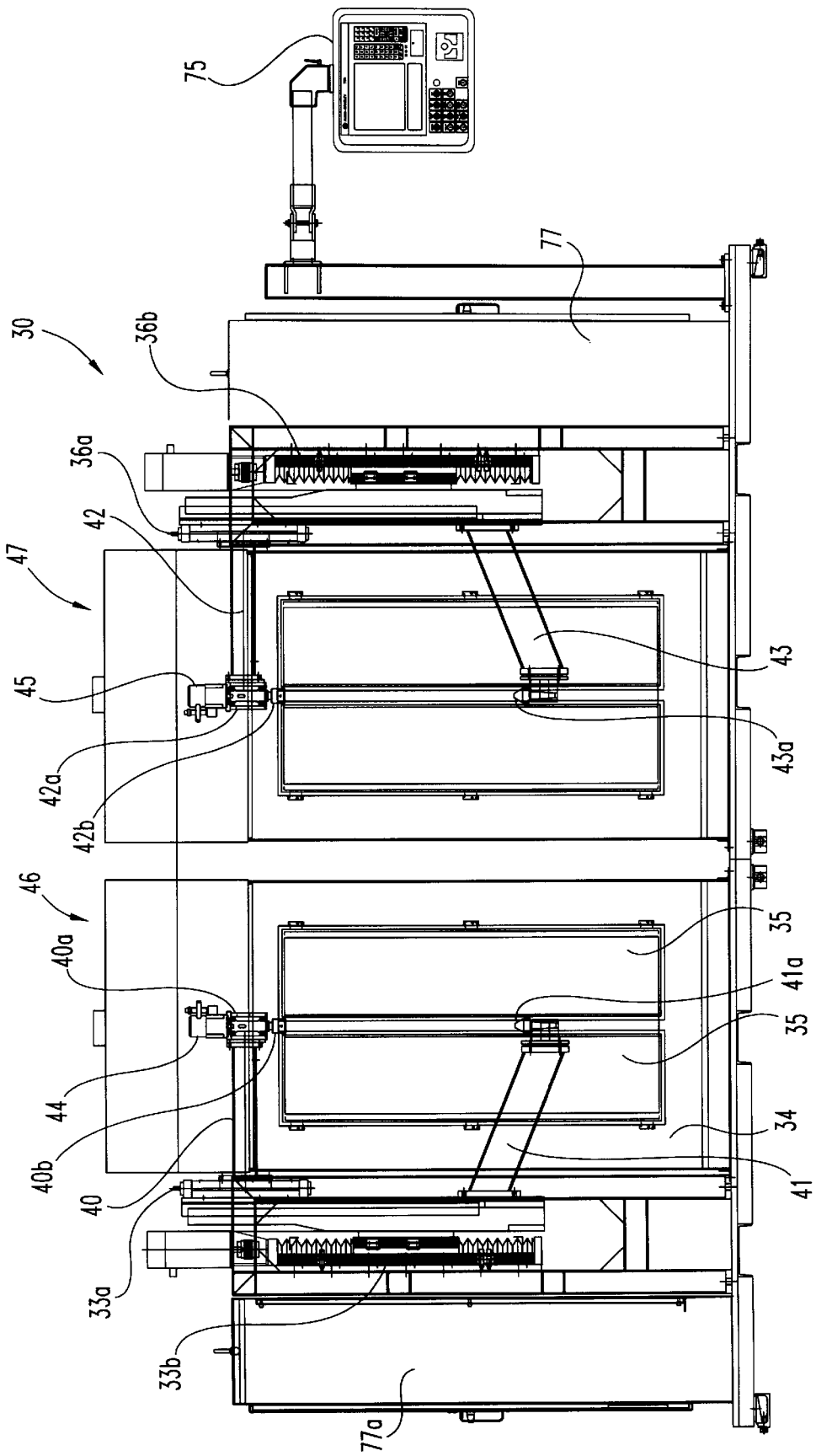
FIG. 10 is a front elevational view of the FIG. 8 induction hardening apparatus.
Figure 11:
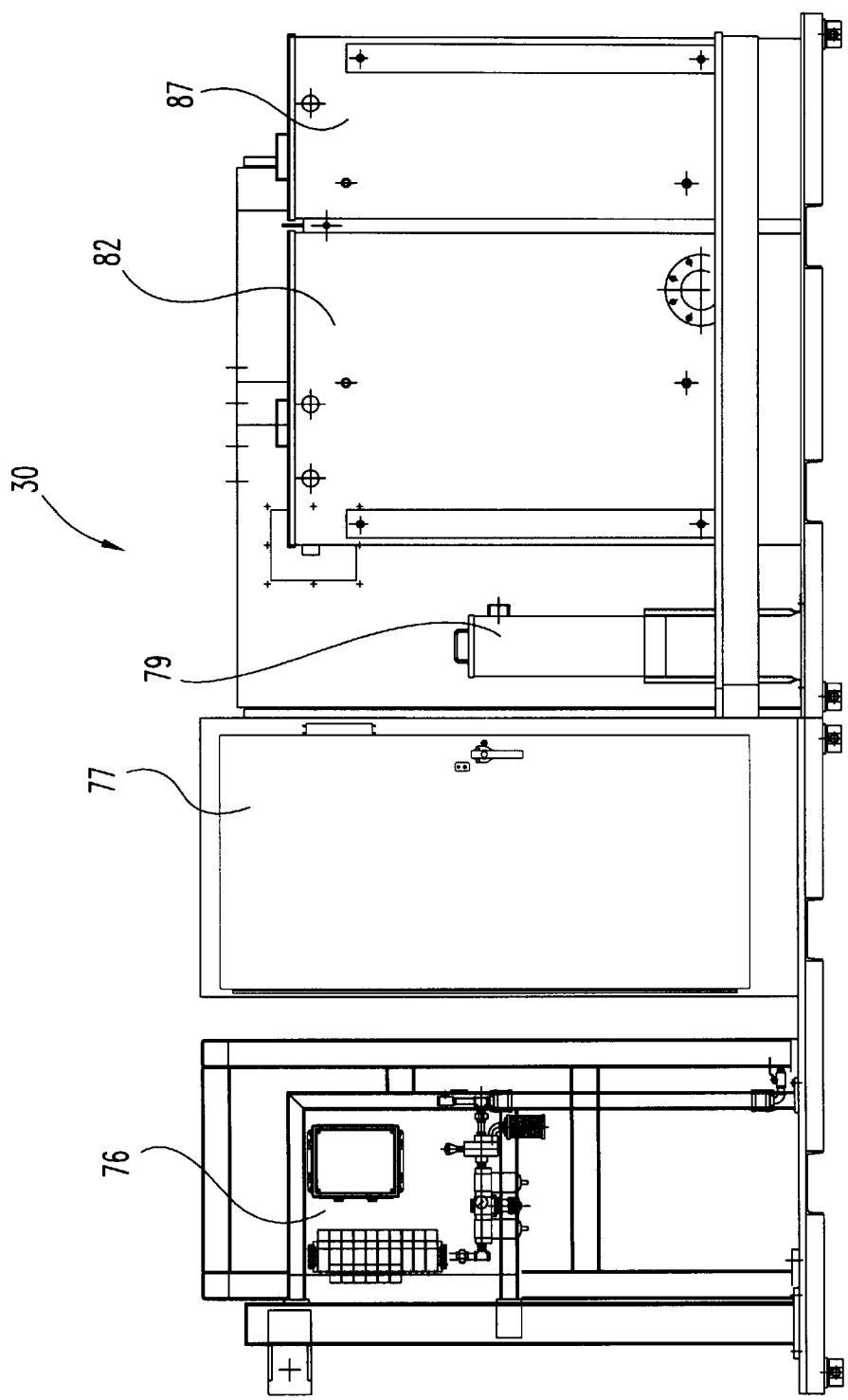
FIG. 11 is a right side elevational view of the FIG. 8 induction hardening apparatus.

The system layout of FIG. 2 for apparatus 20 is virtually duplicated by the system layout for apparatus 30 as illustrated in FIG. 9. Accordingly, the same reference numbers have been used in order to identify components and/or subsystems which are virtually identical in apparata 20 and 30. The principal difference between apparata 20 and 30 is in the X and Y drive systems due to the induction hardening of pins via apparatus 20 and the induction hardening of bearing surfaces via apparatus 30.

With a single coil assembly at each workstation, the inductive heating and quench hardening steps are sequential, one pin or one group of bearing surfaces at a time. Once the crankshaft is vertically supported between centers at the first workstation 33, the induction coil assembly 48 is moved into position and as the crankshaft rotates, the coil assembly 48 generally tracks the orbit of the selected pin at the same rate and inductively heats the pin. This heating step takes approximately 10–20 seconds. Once the pin of the crankshaft is heated to the desired temperature, the quench step needs to be performed. This is achieved in one embodiment by a surge of quench water through the coil assembly and directly onto the pin which has been heated (see FIG. 6A). In another embodiment of the present invention, the coil assembly is disengaged and the crankshaft continues to rotate while a separate quench station is operated. The crankshaft continues to rotate while the quench step is being performed regardless of the embodiment. Once the induction hardening of this first pin is completed, the crankshaft is vertically indexed while the coil assembly remains fixed in order to position to the next pin of the crankshaft. This procedure is repeated until all of the pins of the crankshaft have been inductively heated and quench hardened. The drive systems for the coil assembly are programmed to recognize which pin is selected and the X and Y drive systems are programmed to trace a preselected orbit for that particular pin. Since various embodiments have been described, it must be determined whether any counterweight adjustment is desired and, if so, which type of adjustment will be made. The X and Y travel of the coil assembly is still the same for each pin, once the starting position is determined. Each pin has a different circumferential location relative to the rotary position of the crankshaft and thus the starting position of the coil assembly varies depending on the selected pin.

The induction coil assembly 48 at the first workstation 33 is initially positioned relative to the selected pin prior to rotation of the crankshaft. Accordingly the X-Y tracking path for the coil assembly of the pin orbit needs to have a tracking speed which is synchronized with the speed of the crank-shaft. The speed and path of the coil assembly are critical and must precisely match the speed of the crankshaft and the orbit of the pin. Even when the spacing between the coil assembly and the pin varies, there is still a specific tracking orbit which is traced each cycle. This is not a concern for the bearing surfaces due to the coaxial nature of their orbit.

As has been explained, the induction hardening of the crankshaft pins can be completed prior to the induction hardening of the bearing surfaces or after the induction hardening of all bearing surfaces. The pins and bearing surfaces can be processed at two different workstations as part of one apparatus or by two separate apparata, one dedicated to pins and the other dedicated to bearing surfaces.

Figure 6A:
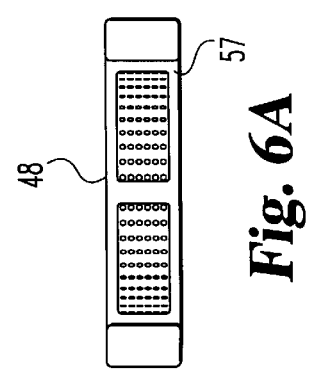
FIG. 6A is a front elevational view of the FIG. 6 induction coil assembly.

As illustrated in FIGS. 5 and 6, a typical coil assembly includes a copper heating element (inductor) 93, an internal cooling jacket 94, a field focusing portion 95 of iron suspended plastic material, isolation spacer 96, and a locator block 97. The field focusing portion is used to manipulate the magnetic flux field. When the quench capability is built into the coil assembly, the inner surface 57 is provided with a plurality of holes in a compact and uniform pattern as illustrated in FIG. 6A. When the quench function is performed by a separate quench mechanism, the quench mechanism is located between the ends of the crankshaft on a positioning mechanism (not illustrated) as is well known in the art.

The programming logic for the present invention which is discussed below is intended to apply to the induction hardening of the pins of the crankshaft and not for the bearing surfaces. This is due to the type of rotational orbit which the pins have relative to the longitudinal axis of the crankshaft as contrasted to the concentric or coaxial location of the bearing surfaces relative to the crankshaft axis. The first item of data to be provided is the engagement position for both the X and Y drive systems so that the corresponding induction coil assembly is properly positioned relative to the corresponding pin which is to be inductively heated and quench hardened. The additional data which will be programmed into the computer control or logic circuit is derived from the particular crankshaft specifications. This data involves the size, shape, and geometry of the crankshaft, including the pins and any counterweights. The required data is entered by way of a keyboard (manual entry). Once the basic part specification data is entered, this will not change and it will be the same regardless of which pin of the crankshaft is being inductively heated and quench hardened. It is to be noted that the engagement position may or may not change, depending on how well the particular crankshaft has been manufactured relative to its design dimensions and tolerances. Additional data or information which the operator can input into the programming logic for the present invention by way of the keyboard includes the tolerances per pin, the number of revolutions, the spin time, the heat time, the spin speed and the power supply output. The spin speed in RPMs during heating is currently set so that there are two RPMs, one per hemisphere. In one hemisphere, the shaft is spinning at 30 RPMs and in another, it is spinning at 50 RPMs. This could be subdivided down into quarters or even smaller sections. It should be understood that the rotational speed can be broken down into smaller increments, allowing a gradual acceleration and/or gradual deceleration as described herein. It is also to be noted that the present invention must be preprogrammed to follow either a circular path or an elliptical path, depending on how one wants to concentrate the heat from the induction coil assembly. These various path options are discussed herein with regard to the alternative embodiments of the present invention. As will be understood, when a circular orbit is being tracked by the induction coil assembly, the X axis drive system follows a cosine wave form and the Y axis drive system follows a sine wave.

With regard to utilization of apparatus 20 consistent with the present invention, the process begins by the robot and/or operator putting the crankshaft on the lower center support and then clamping or chucking onto it at the top in order to start the cycle. The X and Y directions are horizontal and, as described, these two drive systems are connected to each other at 90°. The rotational motion referred to as theta (r) defines the motion of the drive spindle/crankshaft. The Z axis is in the vertical direction and represents the positioning axis for the induction coil assemblies and the crankshaft in a vertical direction.

The first step involves movement in the direction of the Z axis by the crankshaft moving into a position where the pin that is selected for induction heating is placed in a "known" location which is referred to as zero degrees theta (r). Once the pin of the crankshaft is moved to the desired vertical location, the crankshaft is rotated until the theta (r) reading is 0 degrees based on the input from a photosensor switch. Once the theta (r) position of 0 degrees is determined, the system moves the crankshaft along the Z axis (vertical) down into the coil position, which is the position that is going to inductively heat that particular pin. Once the Z axis and theta (r) locations are properly set, then the X-axis drive system is engaged so as to move the induction coil assembly to its engagement point which will line up with the corresponding pin of the crankshaft. Next, the Y-axis drive system is engaged so as to move the induction coil assembly into the crankshaft. As represented on the corresponding drawings, when looking directly into the front of the machine (see FIG. 3), the X- axis direction is left and right and the Y axis direction is into and out of the machine. Accordingly, once the X and Y positions are established and the crankshaft is sitting at zero degrees theta (r), the system starts spinning (in the theta (r) direction), going in a counterclockwise direction. After the spinning motion starts in the theta (r) direction, the X and Y drive systems follow, tracking the particular orbit for that pin, making a corresponding counterclockwise path. While a counterclockwise direction has been selected, it should be noted that the theta (r) direction can be either clockwise or counterclockwise.

It is also to be noted that there is a disengagement position which is the position of theta (r) in degrees where it is possible to disengage the X and Y drive systems safely, extracting the induction coil assembly from its relationship to the crankshaft without "crashing" the machine. As the crankshaft is spinning in a counterclockwise, theta (r) direction, it is going from a zero degree location reading all the way around to a 360 degree location. At the present time, the disengagement position is programmed at approximately 240 degrees. What actually occurs is that the induction coil assembly rotates out of engagement much like gears rotating out of a meshed relationship to one another. The particular disengagement position is based on the part specifications and thus, as the parts change, the disengagement point may also change. However, the disengagement position will generally be in the third quadrant of the circular path of the corresponding crankshaft pin.

Once the induction heating cycle is complete, the controller, which in the case of the present invention is an Allen Bradley Slick 500, will actually indicate that the heating phase has been completed. At this point, the X and Y drives control the disengagement of the induction heating coil, which at the present time is 240 degrees theta (r). In performing the disengagement, the Y axis direction of movement is initially activated so as to back out the coil from its heating position. The X axis will actually stay engaged in order to follow the part so that it does not hit the sides of the coil. Once the Y travel gets approximately 3 inches outside of the programmed axis, it is possible to disengage the X axis drive system and thereby stop X from moving. At this point, the X and Y drive systems return to the home position or loading position for the next pin. It is to be noted that the coil assembly is disengaged from the crankshaft while the crankshaft continues to rotate. This particular disengagement protocol permits the crankshaft to spin during the quench cycle while the coil is disengaged. This particular protocol permits shorter cycle times and uniform quenching. In effect what can be done is to disengage the coil and lower the crankshaft in the Z axis direction and continue with a supplemental quench at that point while the next pin of the crankshaft is positioned for induction hardening. This allows the next pin to be placed in the ready position while the quench cycle for the prior pin is continuing. As indicated, this permits shorter cycle times while not adversely affecting uniform quenching.

A variety of equipment designs and configurations have been illustrated and described relative to FIGS. 1–17. In each case, the selected representation for the induction coil assembly is what can best be described as a 90 degree coil, due to the fact that there are two connected 90 degree paths or fields. In the construction of this style of coil for the induction coil assembly, the current flow through the actual coil comes in and exits by way of the connecting support arm which is centrally connected. There is an out and back 90 degree current path on one side of the support arm and a connected 90 degree current path on the opposite side of the support arm.

Figure 18A:
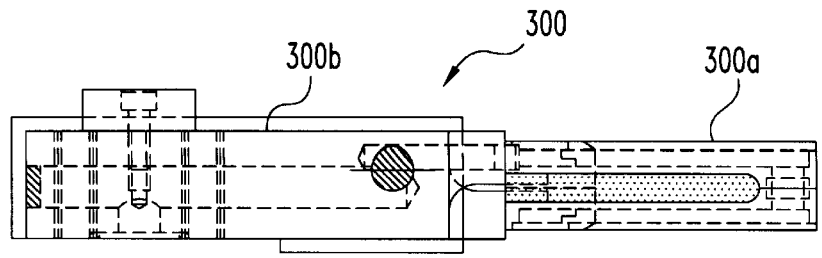
FIG. 18A is a side elevational view of the FIG. 18 induction hardening coil.
Figure 18:
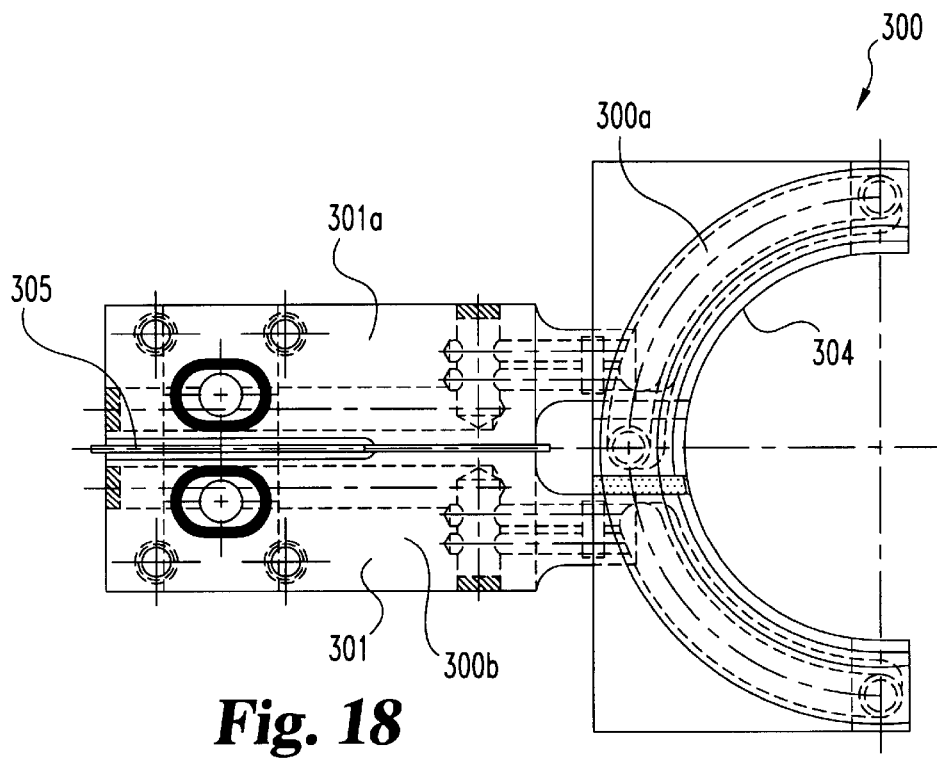
FIG. 18 is a top plan view of a 90 degree induction hardening coil which is suitable for use with the present invention.
Figure 19:
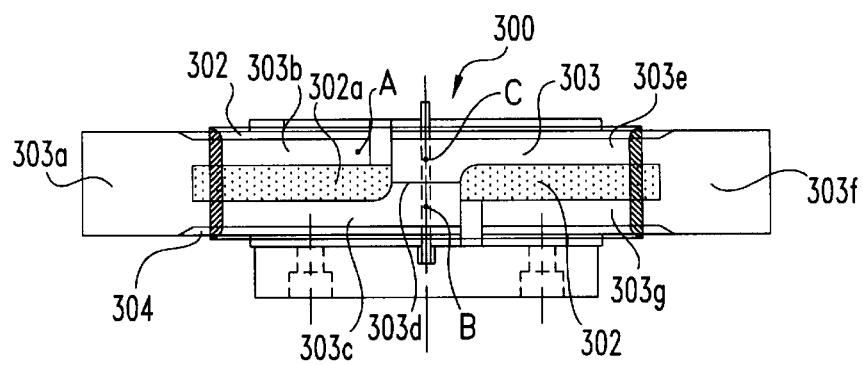
FIG. 19 is a front elevational view of the FIG. 18 induction hardening coil.

With reference to FIGS. 18, 18A, and 19, a 90 degree coil assembly 300 is illustrated. Coil assembly 300 includes coil 300a and support arm 300b. Support arm 300b is constructed with a current-in portion 301 and a current-out portion 301a. These two portions are electrically insulated from each other and are in effect staggered top to bottom one from the other with regard to the ends which connect to the coil 300a. Portions 302 of an electrical insulator material is layered around and between portions 303 of copper conductor material. The incoming current from the connected transformer travels to coil 300a by way of portion 301. The current then travels approximately 90 degrees around the exposed surface 304 of coil 300a from point A to the upper part of portion 303a. The return path is from the lower part of portion 303a back to point B. The return path is also approximately 90 degrees. This 90 degree path is the basis for describing coil assembly 300 as a 90 degree coil.

As used herein, expressions such as the following "90 degree coil", "90 degree induction coil", and "90 degree coil construction" each refer to an induction coil which has a generally semicylindrical opening and a support arm which conducts the current to and from the coil. The support arm is positioned relative to the semicylindrical opening such that it is effectively centered and in this fashion there is an approximate 90 degree portion of the coil opening extending away from one side of the support arm in a first direction and another approximate 90 degree portion of the coil opening extending away from the other (opposite) side of the support arm in a second direction. This construction is clearly illustrated in FIG. 18 and the "90 degree" reference refers to the current travel from the support arm to one end or edge of the semicylindrical opening.

Portions 303b and 303c are insulated by portion 302a of the electrical insulator material. Portion 303d, which includes point B, is centered on the centerline of support arm 300b and on the centerline of coil 300a. The centerline of support arm 300b is also coincident with the centerline of insulator strip 305 which is positioned between portion 301 and portion 301a.

The current flow through portion 303d is from lower point B to upper point C. At point C, the next (second) 90 degree current path begins. This flow path is from point C through portion 303e to portion 303f, along the exposed surface 304. At this point, the current path travels down through portion 303f to portion 303g. The exit from portion 303g is back to the current-out portion 301a of support arm 300b.

The construction of coil assembly 300, as illustrated in FIGS. 18, 18A, and 19, is capable of including a water quench capability by providing quench apertures according to what is illustrated in FIG. 6A into surface 304 of coil 300a. Communicating with these quench apertures are cooperating passageways which are formed on the interior of coil 300a. These quench apertures are not illustrated in FIG. 19 simply for drawing clarity in order to be able to clearly illustrate the conductive and non-conductive portions and the corresponding current paths.

The style of coil assembly 300, as illustrated in FIGS. 18, 18A, and 19, is suitable for use in the illustrated embodiments of FIGS. 1–17 and for the induction hardening of the workpieces which are processed by those illustrated embodiments. However, it has been learned that an alternative style of coil assembly (180 degrees) is preferred for the induction hardening of selected portions of certain workpieces, such as crankshafts.

Figure 20:
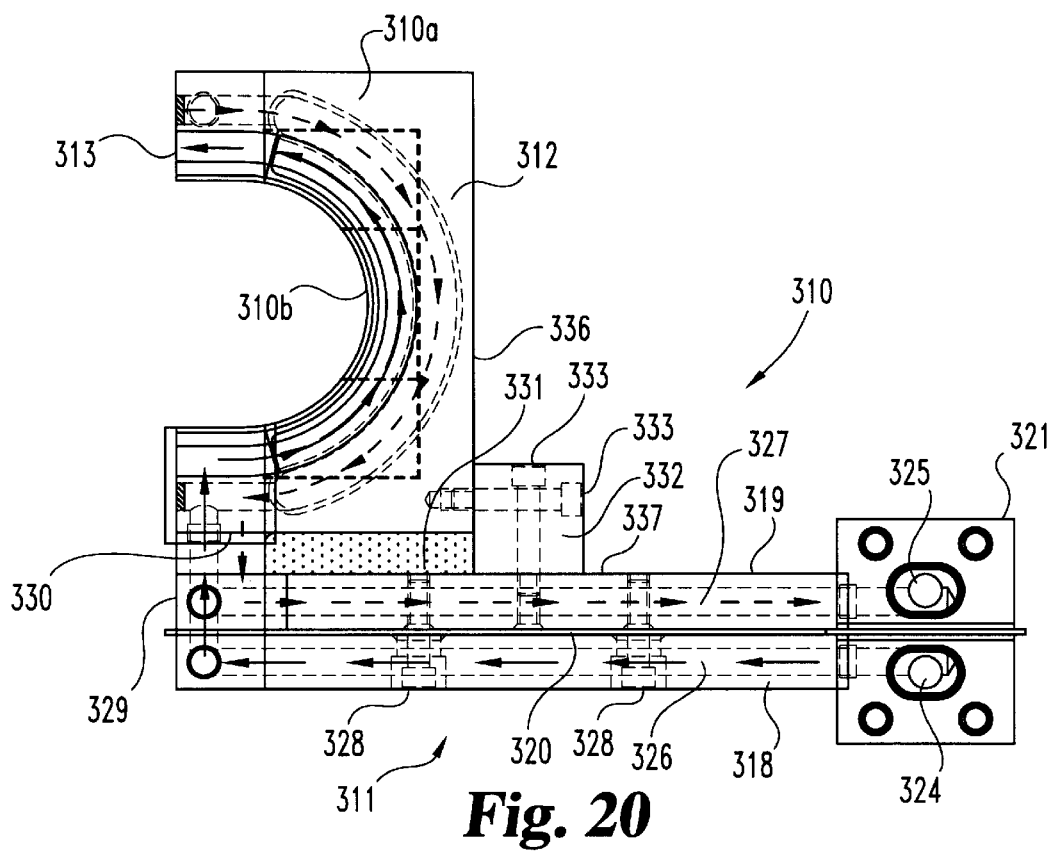
FIG. 20 is a diagrammatic, top plan view of an offset, 180 degree induction hardening coil according to the present invention.
Figure 21:
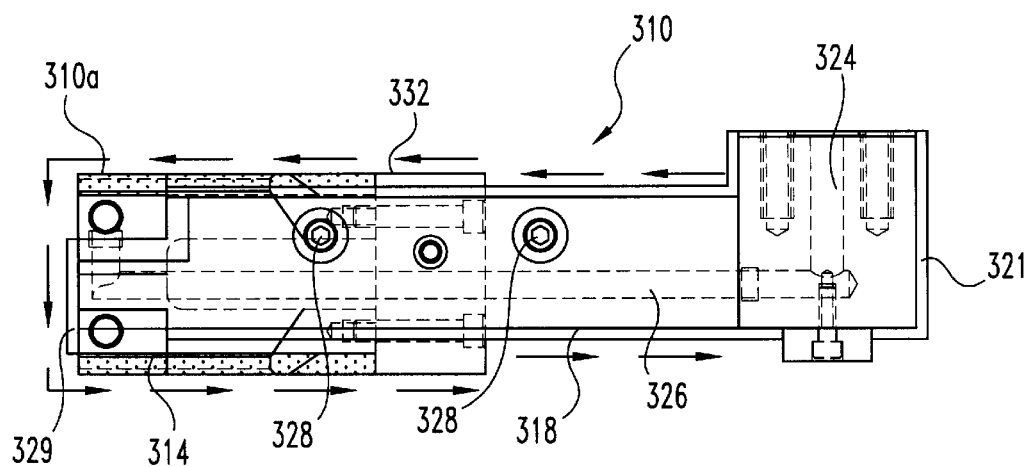
FIG. 21 is a diagrammatic, side elevational view of the FIG. 20 coil.
Figure 22:
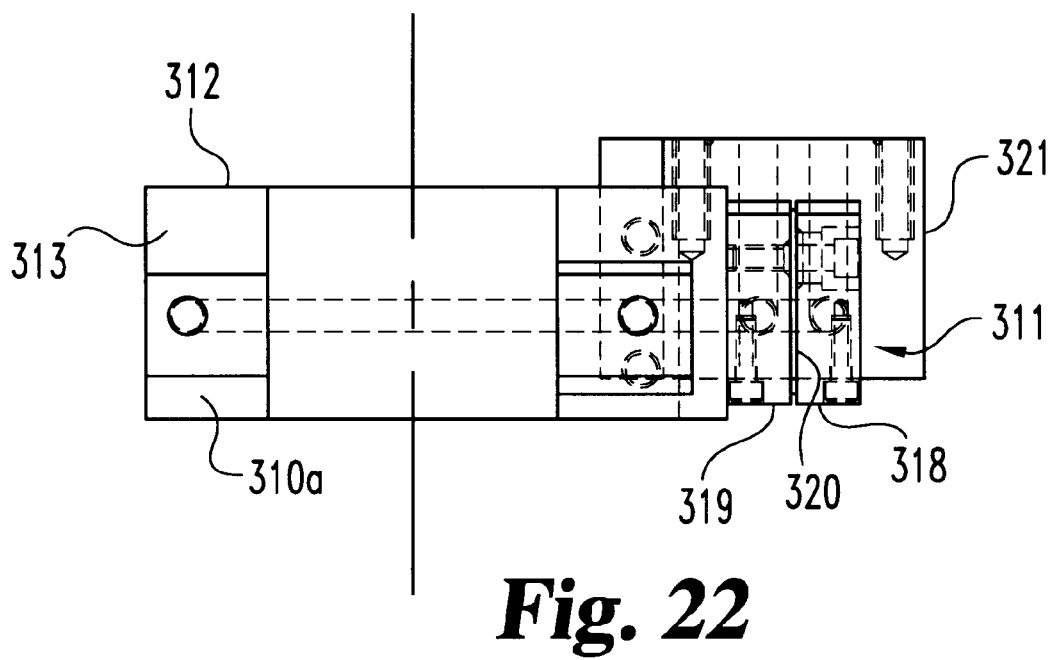
FIG. 22 is a diagrammatic, front elevational view of the FIG. 20 coil.

The alternative style (i.e., "offset") of coil assembly 310 is illustrated in FIGS. 20, 21, and 22. The 180 degree description and the reference to the "offset" style for coil assembly 310 comes from the fact that the connecting support arm 311 is positioned along one side of the actual coil 310a such that the current flow travels in an approximate 180 degree path across the top surface 312 of the coil 310a before traveling down the front surface 313 and returning 180 degrees across the underside surface 314 back to the support arm 311. The current flow path for coil assembly 310 is illustrated by arrows 315. It will be understood that, as between the 90 degree coil style and the 180 degree coil style, the 90 degree coil assembly style is closer to the state of the art or the industry standard. Accordingly, it should be understood that the 180 degree offset style of coil assembly 310, as described herein, is a unique and novel design and a departure from the industry standard. The reference to "offset" in describing coil 310a comes from the support arm location which is offset from center. The construction details of coil assembly 310, including coil 310a and support arm 311, are illustrated in FIGS. 20, 21, and 22 and are described hereinafter. Some of the basic construction details of coil assembly 310 follow the well-known design principles for induction hardening coils. The focus of the uniqueness and novelty of coil assembly 310 is on the specific configuration of coil 310a and importantly on the corresponding current flow path including the 180 degrees of travel around the coil as has been described.

As used herein, the expressions such as "offset 180 degree coil", "offset 180 degree induction coil", and "180 degree offset style of coil" each refer to an induction coil which has a generally semicylindrical opening and a support arm which conducts the current to and from the coil. The support arm is connected to the coil along one side of the coil such that the entire approximate 180 degrees of the semicylindrical coil opening extends away from the support arm. In this fashion, the current which is delivered to and from the coil by means of the support arm, travels from the support arm to the opposite end of the coil, approximately 180 degrees, and then returns to the support arm. This style of induction coil is described as being "offset" because the support arm is not centered relative to the coil but is actually offset to one side of the entire coil. This construction is clearly illustrated in FIG. 20.

With continued reference to FIGS. 20, 21, and 22, the support arm 311 is configured with two conductive portions 318 and 319 (one positive, one negative) which are separated and electrically insulated (and isolated) by insulator panel 320. Connection block 321 is designed to be mechanically and electrically connected to an electrical bus bar (not illustrated) which is operably connected to a transformer (not illustrated). Block 321 is mechanically and electrically connected to each of the two conductive portions 318 and 319. The heating current flows in from the transformer across one conductive portion 318 and back to the transformer by way of the other conductive portion 319. Disposed in block 321 are two water passageways 324 and 325 and each conductive portion includes a corresponding and connecting passageway 326 and 327. Passageway 326 in portion 318 is in flow communication with passageway 324. Passageway 327 in portion 319 is in flow communication with passageway 325.

Threaded fasteners 328 are used to help connect the two conductive portions 318 and 319 together and to mechanically sandwich and secure the insulator panel 320 between the two conductive portions. The end 329 of the support arm 311 (i.e., the assembly of the two conductive portions 318, 319, in combination with the insulator panel 320) is connected to one side 330 of the 180 degree coil 310a. Insulator 331 limits the electrical connection of the support arm 311 to the coil 310a to the localized area of end 329. Block 332 is used as a brace to secure and strengthen the connection of the support arm 311 to the coil 310a. Threaded fasteners 333 are used to attach block 332 to the rear surface 336 of coil 310a and to the longitudinal side 337 of portion 319.

The incoming current flow travels across portion 318, turns the corner at end 329, and flows approximately 180 degrees across the top surface 312 of coil 310a. The current flow path then follows the front surface 313 and flows to the underside surface 314. At this point the current flows 180 degrees back around coil 310a to portion 319, and from there along the underside of portion 319 back to block 321. The heating dynamics of this current flow path for the 180 degree offset coil assembly 310 delivers power to the top edge and then the bottom edge and the center portion last. The current path across top surface 312 is in the shape of a semicircle of at least 180 degrees. The curvature of the path coincides with the curved and cylindrical geometry of the inner face 310b of coil 310a. Inner face 310b extends for at least 180 degrees and represents the surface which is adjacent to the portion of the workpiece to be induction hardened.

What has been learned by a comparison of the heating patterns and heat treating results between the 180 degree coil assembly and the 90 degree coil assembly is that the 90 degree coil assembly creates a heating dynamic which starts at the center area of the workpiece, in particular the selected portion of the workpiece, such as a pin of a crankshaft, before reaching the adjacent or outlying corners. In certain situations where heat treating of the corner portions is desired, the center portion will get too hot before the heat gradually reaches the corners. The cause-effect of this situation is due to the 90 degree current path and the fact that only one-fourth of the pin is heated at any one time (position) and the heat quantity is less for the fixed mass. In contrast, the 180 degree coil 310a has a current path which begins heating the corner portions first and then migrates to the center portion. It is worth noting that in the design of pins and inner mains of a crankshaft, the inside corners being discussed herein are locations of greater mass compared to the actual pin or main. By heating the locations of greater mass first, the heat can build up without overheating the portion of less mass.

Figure 23:
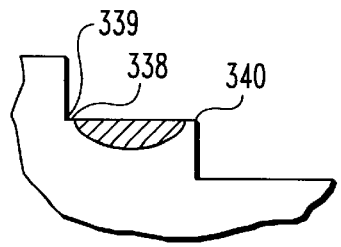
FIG. 23 is a partial, diagrammatic illustration of the resultant heating pattern in a workpiece based upon the style of coil which is used.
Figure 24:
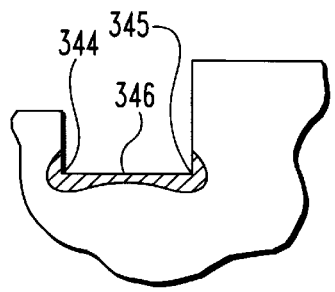
FIG. 24 is a partial, diagrammatic illustration of the resultant heating pattern in a workpiece based upon the style of coil which is used.
Figure 25:
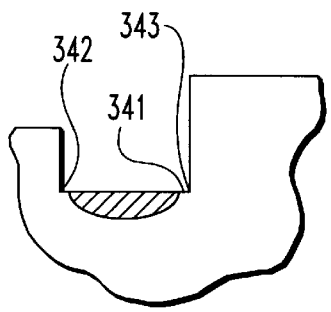
FIG. 25 is a partial, diagrammatic illustration of the resultant heating pattern in a workpiece based upon the style of coil which is used.

In FIGS. 23, 24, and 25, the heating pattern (heat treating) results for different component portions are diagrammatically illustrated for the 90 degree coil assembly 300 and for the 180 degree coil assembly 310. The heating patterns of FIG. 23 is for an outer main bearing 338 and the outer edges or corners 339, 340 do not represent critical areas from the perspective of higher hardness and strength requirements. Accordingly, either style of coil assembly 300 or 310 can be used for an outer main bearing.

When inner main bearings or pins are being hardened, the heat treating pattern needs to include the inside corners because corner strength is critical due to torsional loads. With the 90 degree coil assembly 300, the heating pattern for an inner main bearing or pin 341 is illustrated in FIG. 25. As is illustrated, the interior corners 342, 343 do not receive sufficient heat treating in order to achieve the desired or necessary hardness and strength. In contrast, the heating pattern of FIG. 24 is achieved by the use of the 180 degree coil assembly 310. Here the interior corners 344, 345 on each side of the cylindrical inner main bearing (or pin) 346 are sufficiently heat treated to acquire the desired hardness and strength. As would be understood, the 90 degree coil assembly 300 is suitable to be used for the outer mains (No. 1 and No. 5), while the 180 degree coil assembly 310 should be used for the inner mains (Nos. 2, 3, and 4), for example. While the hardening patterns created by use of the 180 degree coil assembly are extremely important, there are other benefits derived from the use of the 180 degree coil assembly as compared to the 90 degree coil assembly. Using a crankshaft pin as an example, tests have shown that for a typical set up using the 90 degree coil assembly 300, it takes approximately 18 seconds to properly heat the pin for the desired heat treating condition. With the 180 degree coil assembly 310 under otherwise virtually identical conditions, it takes approximately 11 seconds to properly heat the pin for the desired heat treating condition. The time savings is directly related to the fact that by heating the locations of greatest mass first rather than last, time is not lost or wasted waiting for these locations to get up to the necessary temperature. Additionally, with the 180 degree coil 310*a* there is a greater area of mass for water cooling through the coil which in turn permits a greater heat capacity and greater power capability. The heating capacity of the 180 degree coil is effectively doubled in comparison to the 90 degree coil. The 180 degree coil is preferred over the 90 degree coil when less complexity is desired or when a greater or stronger electric field is desired. The 90 degree coil generates less power, uses less copper, and enables less fluid flow for cooling.

The heat treating patterns illustrated in FIGS. 23–25 are derived from microsectioning of actual parts which have been induction hardened using both 90 degree and 180 degree coil assemblies. It is the unique and important heat treating pattern of FIG. 24 which has been discovered as achievable by the use of the novel and unobvious 180 degree offset coil assembly 310 which has been illustrated and described herein.

The arrangement of main bearings, pins, and counterweights varies to some extent with the engine style. For example, an in-line six has three pairs of pins which can be heat treated (i.e., induction hardened) by pairs due to their identical location relative to a top dead center position. As would be understood, pins 3 and 4 can be processed together, concurrently, as can pins 2 and 5, as well as pins 1 and 6. In a V-6 engine, the six pins are grouped into three pairs in order to properly balance the V-6 engine. The two pins of each pair are adjacent to each other and are described as "split pins". This might be regarded as a more unique situation from the perspective of induction hardening, but the crankshaft for a V-6 engine is still a relatively common configuration.

Figure 26:
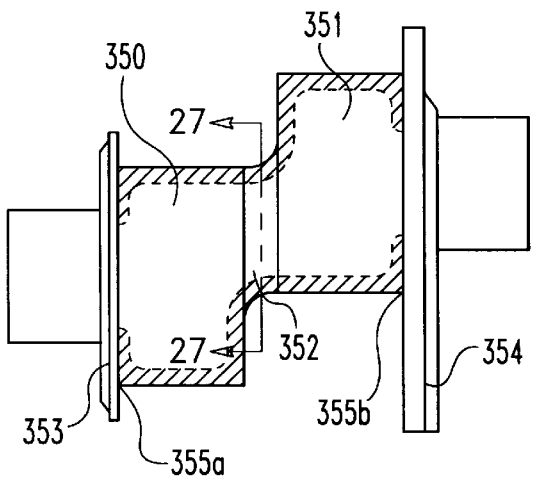
FIG. 26 is a partial, diagrammatic front elevational view of two adjacent pins of a vehicle crankshaft which have a "split-pin" design.
Figure 27:
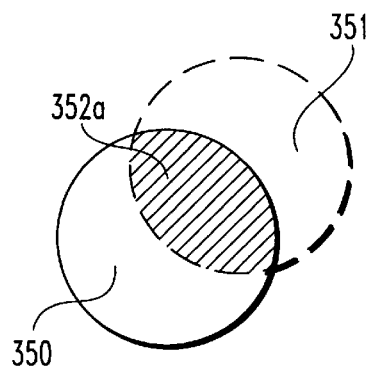
FIG. 27 is a diagrammatic illustration of the offset region between the two adjacent pins of FIG. 26.

A "split pin" pair of crankshaft pins 350 and 351 are diagrammatically illustrated in FIG. 26. These pins are rotatably shifted by a 30 degree offset for proper balance of the V-6 engine. The region 352 disposed between the two pins 350 and 351 has inherent weakness because it is the thinnest section or portion of the crankshaft. FIG. 27 is a diagrammatic illustration of what region 352 looks like in lateral section due to the cylindrical nature of pins 350 and 351 and the fact that these two cylindrical pins are shifted relative to one another so that their cylindrical axes are not coincident. The sector shape 352*a* of region 352 through section 27—27 is referred to as a "football" or football-shape due to its geometry. Included as part of the partial crankshaft illustrated in FIG. 26 are counterweights 353 and 354. The heating (i.e., induction hardening) sequence begins with the radiused inside corners 355*a* and 355*b*. This is followed by the heating (i.e., induction hardening) of the journals (i.e., pins 350 and 351). Consistent with what has been described with the inside corners 344 and 345 of FIG. 24, the inside corners 355*a* and 355*b* are regions of greater mass. The 180 degree coil design generates more heat in this area, due in part to being heated first. The resultant heating pattern is also illustrated in FIG. 26.

Another option for controlling the amount of heat input into the crankshaft or other workpiece is to vary the rate of rotation of the crankshaft depending on the mass which is present adjacent the coil. When the induction hardening coil is adjacent the more narrow portion of the counterweight, for example, the rate of rotation is faster because less heat input is required. As the crankshaft rotates and the larger portion of the counterweight is brought into position adjacent the coil, the rate of rotation is slower so that more heat can be input.

Figure 28:
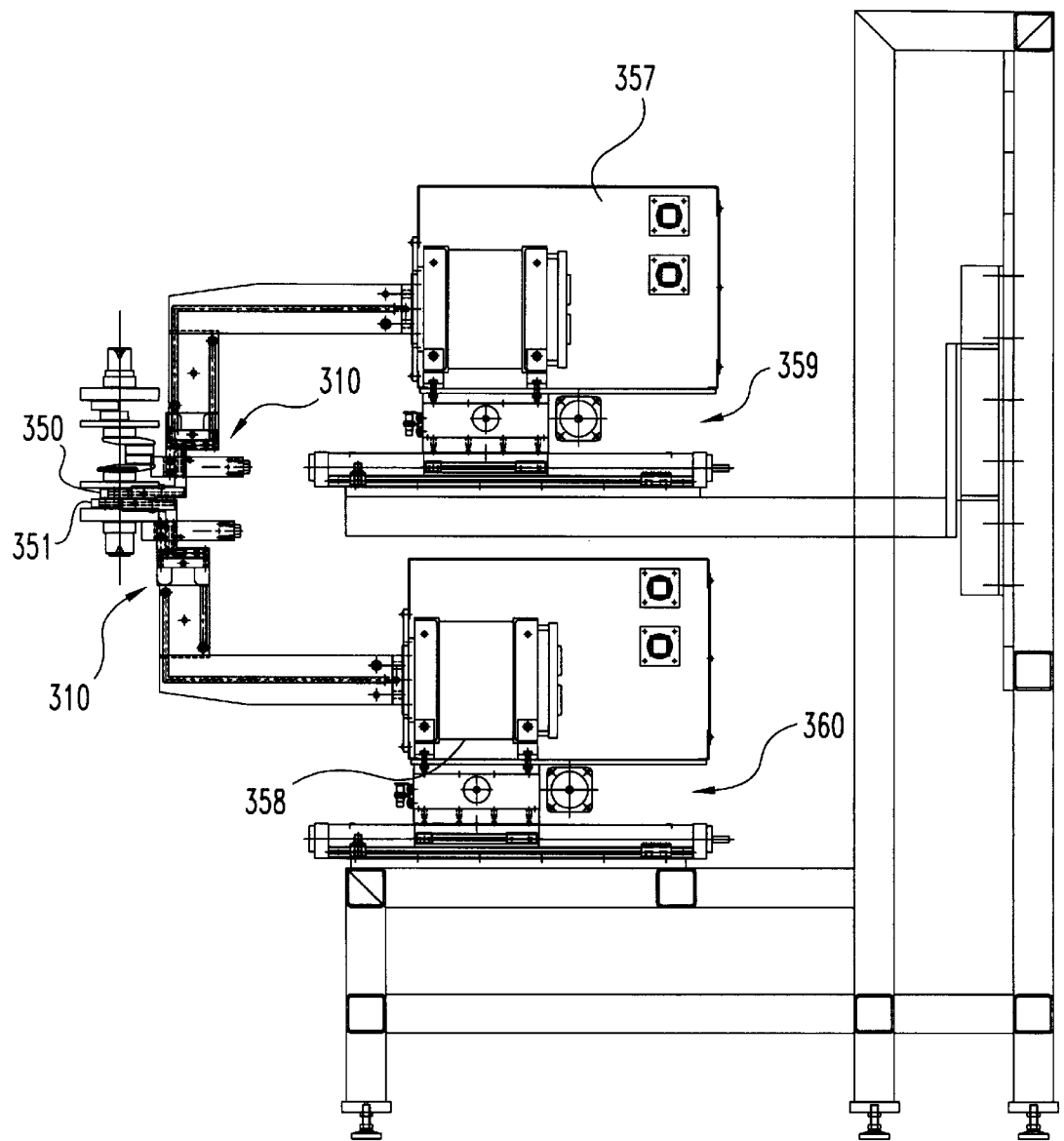
FIG. 28 is a side elevational view of two induction hardening arrangements including transformers for the use of two FIG. 20 coils.

According to the present invention, the preferred approach for the induction hardening of pins 350 and 351 is to use, concurrently, two 180 degree offset coil assemblies 310 (see FIG. 28). Since there is a 30 degree offset or shift, the two coil assemblies will have a similar shift or offset in a direction into or normal to the plane of the paper. By lining up the two coil assemblies on the two pins 350 and 351 of the crankshaft, the transition region 352 is not directly heated. Instead, the heating of the pins will conduct sufficient heat to region 352, considering the thinner mass of this region, to effect the desired induction hardening. Since there are three pairs of offset pins, the heating (induction hardening) described for pins 350 and 351 is basically the same for the other two pairs of pins. As illustrated in FIG. 28, each 180 degree offset coil assembly 310 is electrically and mechanically connected to a corresponding transformer 357 and 358. Each transformer is mounted onto its own corresponding X, Y positioning table 359 and 360.

The proximity of pins 350 and 351 presents an induction hardening challenge because the heating of one pin without the concurrent heating of the adjacent pin causes a tempering back of the edges of the adjacent pin. The proximity of the two pins is sufficiently close that the heat generated for the induction hardening of one pin is not able to be isolated from the adjacent pin in order to prevent the tempering back. If pins 350 and 351 are not induction hardened at the same time, the intermediate region 352, the connection portion between the two pins, remains a soft zone with insufficient hardness.

Figure 29:
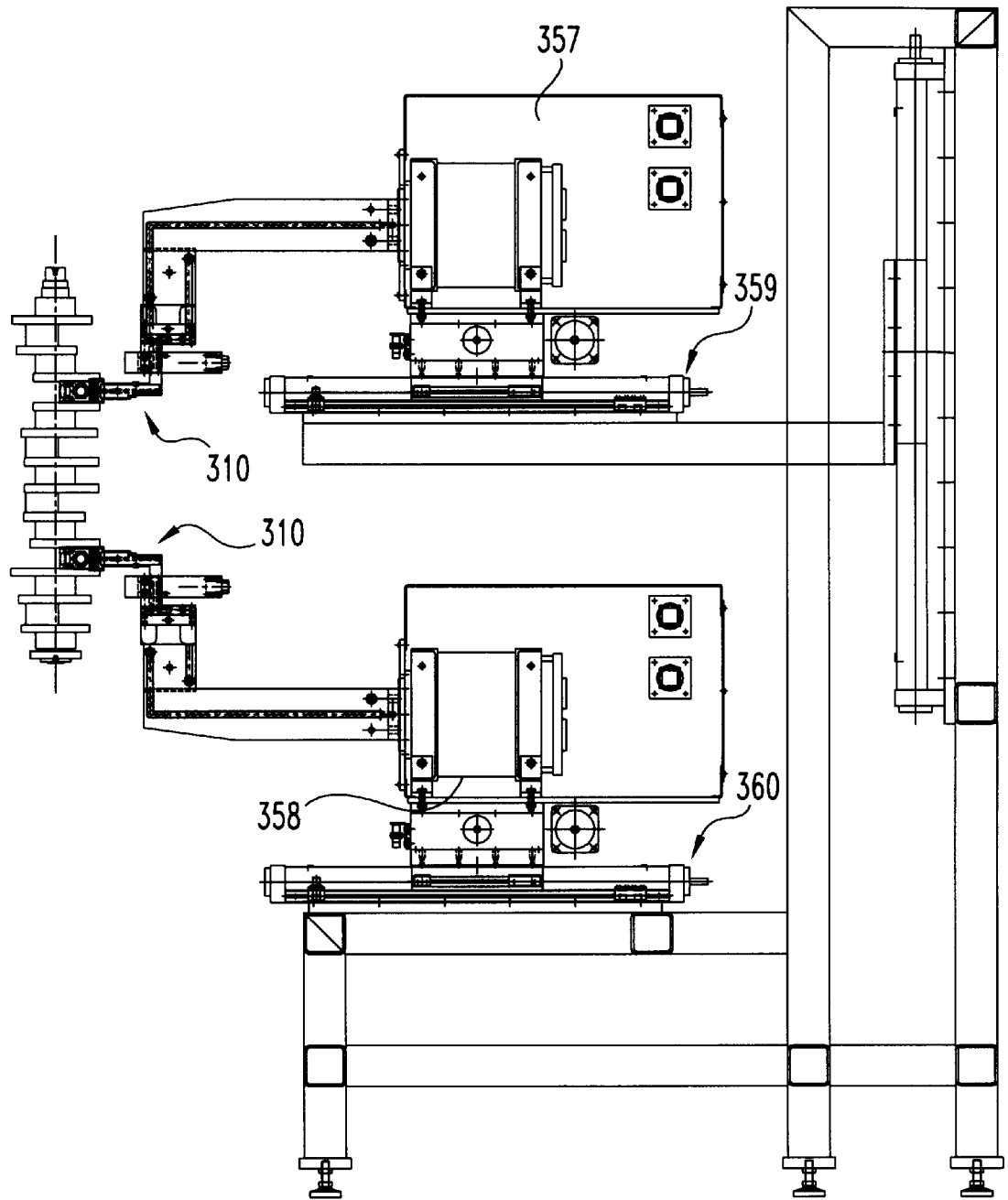
FIG. 29 is a side elevational view of two induction hardening arrangements including transformers for the use of two FIG. 20 coils.

The FIG. 28 arrangement of the two offset coil assemblies 310 is illustrated for the induction hardening of split pins 350 and 351 as part of a V-6 engine crankshaft. The FIG. 29 illustration depicts the use of two offset coil assemblies 310 for the induction hardening of an in-line 6 crankshaft. The only "difference" between the FIG. 28 and FIG. 29 illustrated arrangements is in the style or type of crankshaft being induction hardened.

Figure 30:
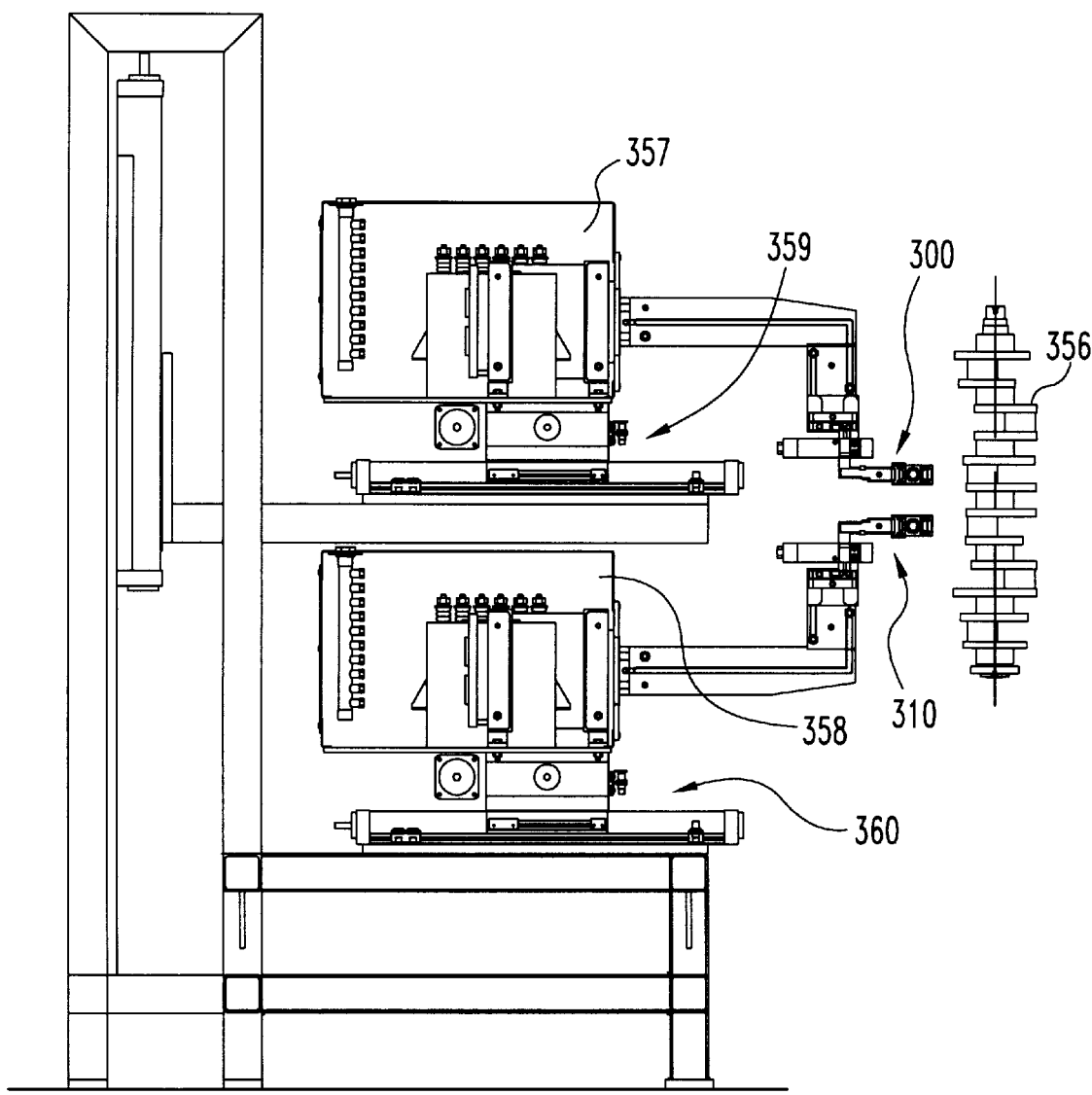
FIG. 30 is a side elevational view of two induction hardening arrangements including a cooperating transformer for each providing the ability to use a FIG. 18 coil and a FIG. 20 coil for the illustrated workpiece.

With reference to FIG. 30 another feature of the present invention is illustrated. The 90 degree coil assembly 300 is appropriate for the outer mains of a crankshaft 356 and the 180 degree coil assembly 310 is preferred for the inner mains of the crankshaft. The use of two different styles of induction coil assemblies on the same workpiece, in this case a crankshaft, requires that when in use, both styles of coil assemblies have the same axial centerline so that the axis of the crankshaft does not have to be shifted or moved. The axis of each induction coil 300*a*, 310*a* of each coil assembly 300, 310 coincides with the vertical or longitudinal axis of rotation of the crankshaft 356, once the coils are moved into position for the non-contact orbital tracking as described herein. It is preferred to offset or shift the two transformers 357, 358 rather than to have to shift the vertical axis of the crankshaft 356 from alignment with one coil assembly 300 to alignment with the other coil assembly 310. According to the present invention it is possible to connect a 90 degree coil assembly 300 to the first transformer 357 and a 180 degree coil assembly 310 to the second transformer 358. While this mix of a 90 degree coil with a 180 degree coil is possible, the more likely arrangement will be to use the same coil style throughout, as illustrated in FIG. 28 (V-6) and in FIG. 29 (in-line 6).

The two transformers are offset or shifted from each other, but the coils are positionable so that for an in-line six cylinder the axial centerlines of the coils coincide with each other and with the vertical axis of rotation of crankshaft 356, when the coils are moved into position. Each transformer is mounted onto its own corresponding X, Y positioning table

359, 360 as previously described for positioning of the induction hardening coils according to the present invention. It should be noted that the axial centerlines of the coils do not coincide with each other and with the vertical axis of rotation of the crankshaft for V-6 configurations (see FIG. 28).

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An induction hardening apparatus for inductively heating and quench hardening a workpiece, said induction hardening apparatus comprising:

fixture means for positioning and supporting said workpiece at a workpiece location;

rotary drive means for rotating said workpiece;

an induction hardening station positioned adjacent said workpiece location and including a contact-free induction coil and a contact-free positioning system for moving said induction coil in a predetermined path;

control means for generating coil path data based upon the geometry and dimensions of a portion of said workpiece to be induction hardened, said control means being operatively connected to said positioning system; and said portion of said workpiece moving in an orbital path during workpiece rotation and said predetermined path generated by said positioning system tracking said orbital path whereby the spacing between an inside surface of said induction coil and said workpiece portion during rotation of said workpiece remaining substantially uniform, said induction coil being moved so as to be free of any contact with said workpiece portion.

2. The induction hardening apparatus of claim 1 wherein said induction coil is an offset 180 degree coil.

3. The induction hardening apparatus of claim 2 wherein said positioning system includes X and Y drive systems arranged relative to each other at a right angle.

4. The induction hardening apparatus of claim 3 wherein said workpiece is a crankshaft and said fixture means includes a pair of oppositely-disposed center supports for positioning and supporting said crankshaft.

5. The induction hardening apparatus of claim 4 wherein said orbital path is circular.

6. The induction hardening apparatus of claim 5 wherein said positioning system further includes electronic control of the X and Y drive systems.

7. The induction hardening apparatus of claim 6 which includes a second induction coil with a 90 degree coil construction.

8. The induction hardening apparatus of claim 7 wherein said 180 degree coil is operably connected to a first transformer and said 90 degree coil is operably connected to a second transformer.

9. The induction hardening apparatus of claim 8 wherein said workpiece is a crankshaft.

10. An induction hardening apparatus for inductively heating and quench hardening a crankshaft, said induction hardening apparatus comprising:

fixture means for positioning and supporting a crankshaft at a crankshaft location;

rotary drive means for rotating said crankshaft;

an induction hardening station positioned adjacent said crankshaft location and including an induction coil and a positioning system for moving said induction coil in a predetermined path;

control means for generating coil path data based upon the geometry and dimensions of a portion of said crankshaft to be induction hardened; and said portion of said crankshaft moving in an orbital path during crankshaft rotation and said predetermined path generated by said positioning system tracking said orbital path whereby the spacing between an inside surface of said induction coil and said crankshaft portion during rotation of said crankshaft remaining substantially uniform.

11. The induction hardening apparatus of claim 10 wherein said induction coil is an offset 180 degree coil.

12. The induction hardening apparatus of claim 11 wherein said positioning system includes X and Y drive systems arranged relative to each other at a right angle.

13. The induction hardening apparatus of claim 12 wherein said orbital path is circular.

14. The induction hardening apparatus of claim 13 wherein said positioning system further includes electronic control of the X and Y drive systems.

15. The induction hardening apparatus of claim 14 wherein said induction coil is constructed and arranged with quench fluid openings for delivering a quench fluid to said portion of said crankshaft.

16. The induction hardening apparatus of claim 15 which includes a second induction coil with a 90 degree coil construction.

17. An induction hardening apparatus for inductively heating and quench hardening a workpiece, said induction hardening apparatus comprising:

fixture means for positioning and supporting said workpiece at a workpiece location;

drive means for moving said workpiece in a desired path;

an induction hardening station positioned adjacent said workpiece location and including an offset 180 degree induction coil and a positioning system for moving said offset 180 degree induction coil in a predetermined path;

control means for generating coil path data based upon the geometry and dimensions of a portion of said workpiece to be induction hardened, said control means being operatively connected to said positioning system; and said portion of said workpiece moving in an orbital path during workpiece rotation and said predetermined path generated by said positioning system tracking said orbital path whereby there is spacing between an inside surface of said offset 180 degree induction coil and said workpiece portion during rotation of said workpiece, said spacing having a variable dimension during at least one revolution of said workpiece, said offset 180 degree induction coil being moved so as to be free of any contact with said workpiece portion.

18. An induction hardening apparatus for inductively heating and quench hardening a workpiece, said induction hardening apparatus comprising:

fixture means for positioning and supporting said workpiece at a workpiece location;

rotary drive means for rotating said workpiece;

an induction hardening station positioned adjacent said workpiece location and including an induction coil and a positioning system for moving said induction coil in a predetermined path, said predetermined path being based upon the geometry and dimensions of a portion of said workpiece to be induction hardened; and said portion of said workpiece moving in an orbital path during workpiece rotation and said predetermined path generated by said positioning system tracking said orbital path whereby there is spacing between an inside surface of said induction coil and said workpiece portion during rotation of said workpiece, said spacing remaining substantially uniform, said induction coil being moved so as to be free of any contact with said workpiece portion.

19. An induction hardening apparatus for inductively heating and quench hardening a workpiece, said induction hardening apparatus comprising:

fixture means for positioning and supporting said workpiece at a workpiece location;

rotary drive means for rotating said workpiece;

an induction hardening station positioned adjacent said workpiece location and including an induction coil and a positioning system for moving said induction coil in a predetermined path;

control means for generating coil path data based upon the geometry and dimensions of a portion of said workpiece to be induction hardened, said control means being operatively connected to said positioning system; and said portion of said workpiece moving in an orbital path during workpiece rotation and said predetermined path generated by said positioning system tracking said orbital path whereby there is spacing between an inside surface of said induction coil and said workpiece portion during rotation of said workpiece, said spacing having a variable dimension during at least one revolution of said workpiece, said induction coil being moved so as to be free of any contact with said workpiece portion.

20. An induction hardening apparatus for inductively heating and quench hardening a workpiece, said induction hardening apparatus comprising:

fixture means for positioning and supporting said workpiece at a workpiece location;

drive means for moving said workpiece in a desired path;

an induction hardening station positioned adjacent said workpiece location and including an induction coil and a positioning system for moving said induction coil in a predetermined path;

control means for generating coil path data based upon the geometry and dimensions of a portion of said workpiece to be induction hardened, said control means being operatively connected to said positioning system; and said portion of said workpiece moving in an orbital path during workpiece rotation and said predetermined path generated by said positioning system tracking said orbital path whereby there is spacing between an inside surface of said induction coil and said workpiece portion during rotation of said workpiece, said spacing remaining substantially uniform, said induction coil being moved so as to be free of any contact with said workpiece portion.

21. An induction hardening apparatus for inductively heating and quench hardening a workpiece, said induction hardening apparatus comprising:

fixture means for positioning and supporting said workpiece at a workpiece location;

drive means for moving said workpiece in a desired path;

an induction hardening station positioned adjacent said workpiece location and including an induction coil and a positioning system for moving said induction coil in a predetermined path, said predetermined path being based upon the geometry and dimensions of a portion of said workpiece to be induction hardened; and said portion of said workpiece moving in an orbital path during workpiece rotation and said predetermined path generated by said positioning system tracking said orbital path whereby the spacing between an inside surface of said induction coil and said workpiece portion during rotation of said workpiece remaining substantially uniform, said induction coil being moved so as to be free of any contact with said workpiece portion.

22. An induction hardening apparatus for inductively heating and quench hardening a workpiece, said induction hardening apparatus comprising:

fixture means for positioning and supporting said workpiece at a workpiece location;

drive means for moving said workpiece in a desired path;

an induction hardening station positioned adjacent said workpiece location and including an induction coil and a positioning system for moving said induction coil in a predetermined path;

control means for generating coil path data based upon the geometry and dimensions of a portion of said workpiece to be induction hardened, said control means being operatively connected to said positioning system; and said portion of said workpiece moving in an orbital path during workpiece rotation and said predetermined path generated by said positioning system tracking said orbital path whereby there is spacing between an inside surface of said induction coil and said workpiece portion during rotation of said workpiece, said spacing having a variable dimension during at least one revolution of said workpiece, said induction coil being moved so as to be free of any contact with said workpiece portion.

23. An induction hardening apparatus for inductively heating and quench hardening a workpiece, said induction hardening apparatus comprising:

fixture means for positioning and supporting said workpiece at a workpiece location;

rotary drive means for rotating said workpiece;

an induction hardening station positioned adjacent said workpiece location and including an offset 180 degree induction coil and a positioning system for moving said offset 180 degree induction coil in a predetermined path, said predetermined path being based upon the geometry and dimensions of a portion of said workpiece to be induction hardened; and said portion of said workpiece moving in an orbital path during workpiece rotation and said predetermined path generated by said positioning system tracking said orbital path whereby there is spacing between an inside surface of said offset 180 degree induction coil and said workpiece portion during rotation of said workpiece, said spacing remaining substantially uniform, said offset 180 degree induction coil being moved so as to be free of any contact with said workpiece portion.

24. An induction hardening apparatus for inductively heating and quench hardening a workpiece, said induction hardening apparatus comprising:

fixture means for positioning and supporting said workpiece at a workpiece location;

rotary drive means for rotating said workpiece;

an induction hardening station positioned adjacent said workpiece location and including an offset 180 degree induction coil and a positioning system for moving said offset 180 degree induction coil in a predetermined path;

control means for generating coil path data based upon the geometry and dimensions of a portion of said workpiece to be induction hardened, said control means being operatively connected to said positioning system; and said portion of said workpiece moving in an orbital path during workpiece rotation and said predetermined path generated by said positioning system tracking said orbital path whereby there is spacing between an inside surface of said offset 180 degree induction coil and said workpiece portion during rotation of said workpiece, said spacing having a variable dimension during at least one revolution of said workpiece, said offset 180 degree induction coil being moved so as to be free of any contact with said workpiece portion.

25. An induction hardening apparatus for inductively heating and quench hardening a workpiece, said induction hardening apparatus comprising:

fixture means for positioning and supporting said workpiece at a workpiece location;

drive means for moving said workpiece in a desired path;

an induction hardening station positioned adjacent said workpiece location and including an offset 180 degree induction coil and a positioning system for moving said offset 180 degree induction coil in a predetermined path;

control means for generating coil path data based upon the geometry and dimensions of a portion of said workpiece to be induction hardened, said control means being operatively connected to said positioning system; and said portion of said workpiece moving in an orbital path during workpiece rotation and said predetermined path generated by said positioning system tracking said orbital path whereby there is spacing between an inside surface of said offset 180 degree induction coil and said workpiece portion during rotation of said workpiece, said spacing remaining substantially uniform, said offset 180 degree induction coil being moved so as to be free of any contact with said workpiece portion.

26. An induction hardening apparatus for inductively heating and quench hardening a workpiece, said induction hardening apparatus comprising:

fixture means for positioning and supporting said workpiece at a workpiece location;

drive means for moving said workpiece in a desired path;

an induction hardening station positioned adjacent said workpiece location and including an offset 180 degree induction coil and a positioning system for moving said offset 180 degree induction coil in a predetermined path, said predetermined path being based upon the geometry and dimensions of a portion of said workpiece to be induction hardened; and said portion of said workpiece moving in an orbital path during workpiece rotation and said predetermined path generated by said positioning system tracking said orbital path whereby the spacing between an inside surface of said offset 180 degree induction coil and said workpiece portion during rotation of said workpiece remaining substantially uniform, said offset 180 degree induction coil being moved so as to be free of any contact with said workpiece portion.

\* \* \* \* \*